(12) United States Patent
Arakawa et al.

(10) Patent No.: US 7,972,216 B2
(45) Date of Patent: Jul. 5, 2011

(54) VIDEO GAME SYSTEM AND CAMERA ACCESSORY FOR A VIDEO GAME SYSTEM

(75) Inventors: Minoru Arakawa, Medina, WA (US); Donald W. James, Kirkland, WA (US); David McCarten, Bothell, WA (US); Wayne A. Shirk, Bellevue, WA (US)

(73) Assignee: Nintendo Co. Ltd., Kyoto (JP)

( * ) Notice: Subject to any disclaimer, the term of this patent is extended or adjusted under 35 U.S.C. 154(b) by 4 days.

(21) Appl. No.: 10/886,577

(22) Filed: Jul. 9, 2004

(65) Prior Publication Data
US 2004/0242333 A1 Dec. 2, 2004

Related U.S. Application Data

(62) Division of application No. 09/726,224, filed on Nov. 28, 2000, now Pat. No. 6,811,492.

(60) Provisional application No. 60/190,555, filed on Mar. 20, 2000.

(51) Int. Cl.
A63F 9/24 (2006.01)
(52) U.S. Cl. ......................................................... 463/47
(58) Field of Classification Search .............. 463/30, 463/31, 36–48; 273/148 B; 348/14.01, 14.02, 348/46, 49, 61, 73
See application file for complete search history.

(56) References Cited

U.S. PATENT DOCUMENTS

| | | | |
|---|---|---|---|
| 4,141,176 A | 2/1979 | Flicker et al. ................. 446/361 |
| 4,710,873 A | 12/1987 | Breslow et al. ................. 463/31 |
| 5,166,953 A * | 11/1992 | Hershey et al. ................ 375/133 |
| 5,231,501 A * | 7/1993 | Sakai .......................... 348/231.9 |
| 5,357,091 A * | 10/1994 | Ozawa et al. .................. 235/380 |
| 5,387,955 A | 2/1995 | Cocca ............................. 396/59 |
| 5,414,444 A | 5/1995 | Britz .............................. 345/156 |
| 5,428,528 A * | 6/1995 | Takenouchi et al. ............. 463/42 |
| 5,475,441 A * | 12/1995 | Parulski et al. ................. 348/552 |
| 5,527,261 A | 6/1996 | Monroe et al. .................. 600/109 |
| 5,595,389 A | 1/1997 | Parulski et al. ................. 463/31 |
| 5,604,551 A | 2/1997 | Choi et al. ....................... 396/58 |
| 5,618,045 A * | 4/1997 | Kagan et al. .................... 463/40 |
| 5,633,678 A | 5/1997 | Parulski et al. ............. 348/231.5 |
| 5,666,159 A | 9/1997 | Parulski et al. ............. 348/211.2 |
| 5,708,853 A * | 1/1998 | Sanemitsu ....................... 710/73 |
| 5,754,227 A | 5/1998 | Fukuoka .................... 348/231.6 |
| 5,760,824 A | 6/1998 | Hicks, III .................... 348/14.02 |
| 5,773,332 A * | 6/1998 | Glad .............................. 439/344 |
| 5,808,672 A * | 9/1998 | Wakabayashi et al. ..... 348/220.1 |
| 5,809,520 A | 9/1998 | Edwards et al. ............... 711/115 |
| 5,830,065 A | 11/1998 | Sitrick ............................. 463/31 |
| 5,844,601 A | 12/1998 | McPheely et al. ............. 348/143 |
| 5,926,438 A * | 7/1999 | Saito .............................. 367/111 |
| 5,951,015 A | 9/1999 | Smith et al. ................... 273/358 |
| 5,984,780 A | 11/1999 | Takemoto et al. .............. 463/20 |
| 5,990,938 A | 11/1999 | Bern ............................. 348/152 |
| 6,069,648 A | 5/2000 | Suso et al. .................. 348/14.02 |
| D429,269 S | 8/2000 | Renkis ......................... D16/203 |
| D429,743 S | 8/2000 | Renkis ......................... D16/203 |
| 6,118,485 A * | 9/2000 | Hinoue et al. ................. 348/373 |
| 6,120,379 A | 9/2000 | Tanaka et al. ................... 463/44 |

(Continued)

Primary Examiner — Pierre E Elisca
(74) Attorney, Agent, or Firm — Nixon & Vanderhye P.C.

(57) ABSTRACT

A digital camera accessory is provided for use with a game system having a processing system to execute a video game program and player controls operable by a user to generate video game control signals. The digital camera accessory includes an image sensor for capturing video images, communication circuitry configured to transmit the captured video images, and a connector that, in use, electrically connects the digital camera accessory to the game system.

18 Claims, 17 Drawing Sheets

U.S. PATENT DOCUMENTS

| | | | |
|---|---|---|---|
| 6,137,525 A | 10/2000 | Lee et al. | 348/14.02 |
| 6,139,432 A | 10/2000 | Watanabe et al. | 463/31 |
| 6,174,205 B1 * | 1/2001 | Madsen et al. | 439/638 |
| 6,201,562 B1 | 3/2001 | Lor | 348/14.01 |
| 6,227,974 B1 | 5/2001 | Eilat et al. | 463/40 |
| 6,238,291 B1 * | 5/2001 | Fujimoto et al. | 463/44 |
| 6,243,772 B1 * | 6/2001 | Ghori et al. | 710/68 |
| 6,317,039 B1 | 11/2001 | Thomason | 340/505 |
| 6,350,199 B1 | 2/2002 | Williams et al. | 463/16 |
| 6,432,046 B1 | 8/2002 | Yarush et al. | 600/179 |
| 6,435,969 B1 | 8/2002 | Tanaka et al. | 463/44 |
| 6,519,416 B1 | 2/2003 | Choi et al. | 386/117 |
| 6,522,352 B1 | 2/2003 | Strandwitz et al. | 348/211.2 |
| 6,540,610 B2 | 4/2003 | Chatani | 463/31 |
| 6,540,615 B2 | 4/2003 | Tanaka et al. | 463/44 |
| 6,716,103 B1 * | 4/2004 | Eck et al. | 463/45 |
| 6,724,826 B1 * | 4/2004 | Varian | 375/240.29 |
| 6,760,748 B1 * | 7/2004 | Hakim | 709/204 |
| 6,811,492 B1 | 11/2004 | Arakawa et al. | |
| 2005/0266878 A1 * | 12/2005 | Lee et al. | 455/556.1 |
| 2011/0051982 A1 * | 3/2011 | Abreu | 381/384 |

* cited by examiner

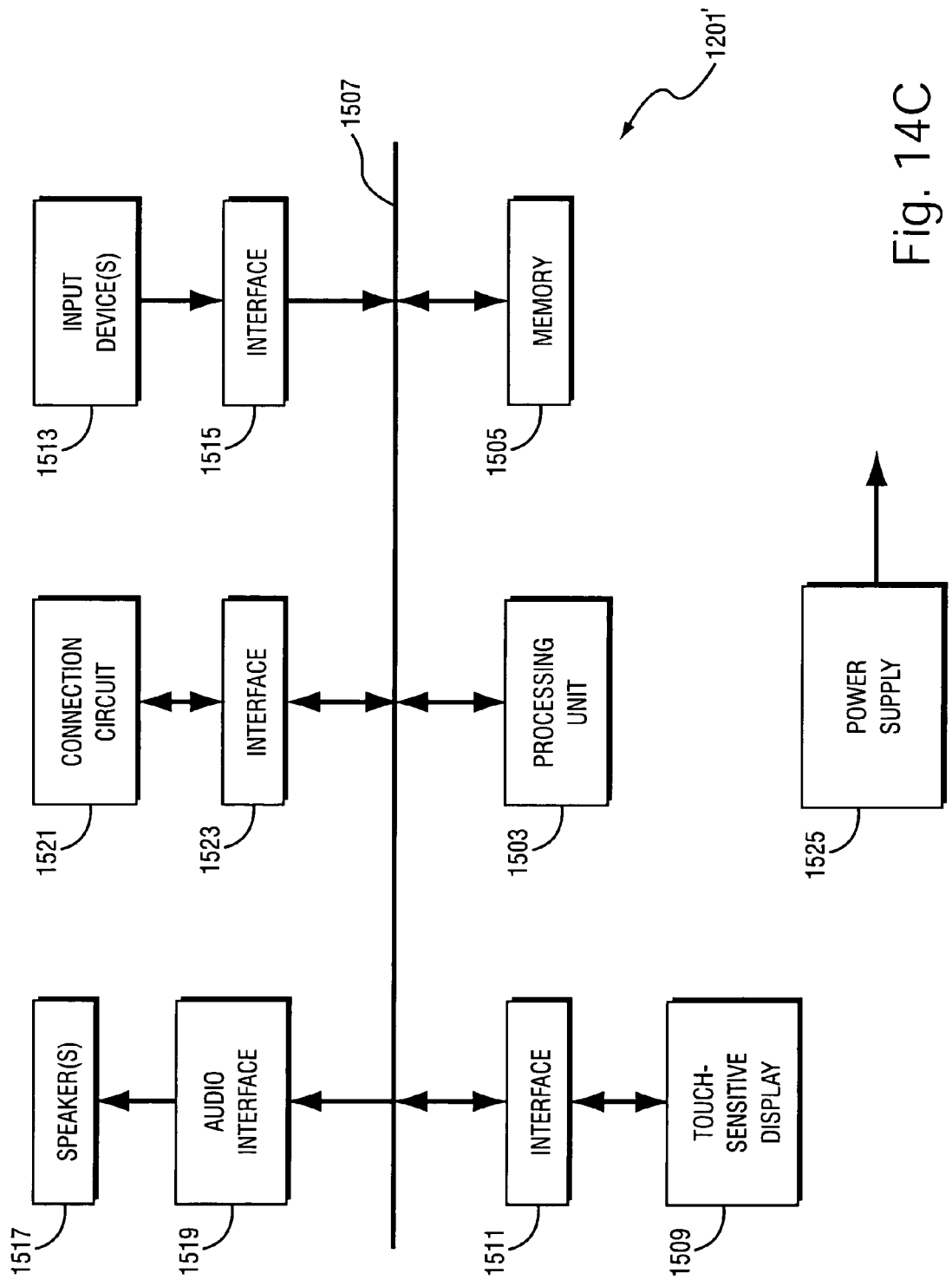

VIDEO GAME SYSTEM AND CAMERA ACCESSORY FOR A VIDEO GAME SYSTEM

CROSS-REFERENCE TO RELATED APPLICATIONS

This application is a divisional of application Ser. No. 09/726,224 filed Nov. 28, 2000, now U.S. Pat. No. 6,811,492 which claims priority from provisional Application No. 60/190,555 filed Mar. 20, 2000. The contents of provisional Application No. 60/190,555 are incorporated herein.

TECHNICAL FIELD

This application generally relates to a portable game system and, more particularly, to a portable game system that is selectively configurable for detecting, transmitting, and receiving video and/or audio data.

BACKGROUND AND SUMMARY

Over the years, portable (or hand-held) game systems have been (and continue to be) very popular. Typically, these portable game systems include a hand-held game system housing a processing unit and associated hardware for running a game program, and include a display for displaying images of the game. The game program itself is typically contained in a game program memory such as, for example, a semiconductor memory (e.g., ROM, EPROM, etc.) that is part of a removable cartridge. By storing the game program in a removable cartridge, the user can conveniently and easily change the game being played by simply exchanging one cartridge with another, different cartridge containing a different game. Examples of portable game machines are the "Game Boy®" and "Game Boy® Color" products.

Generally, the functionality of conventional portable game systems of the type described above is directed to executing the game that is contained in the game program memory of a particular removable cartridge. It is desirable to provide accessories that expand the functionality of portable game systems.

In accordance with one example embodiment, a digital camera accessory is provided for use with a game system having a processing system to execute a video game program and player controls operable by a user to generate video game control signals. The digital camera accessory includes an optical sensor for capturing video images, communication circuitry configured to transmit the captured video images, and a connector that, in use, electrically connects the digital camera accessory to the game system. The digital camera accessory may also include an audio sensor (e.g., microphone) for sensing audio. The communication circuitry may be configured to also transmit the sensed audio data, as well as to receive video and/or audio data transmitted from a remote location.

The digital camera accessory may be used, for example, to provide a "video telephone" capability. A moving video image captured by the optical sensor is transmitted by the communication circuitry to the other party to the "call." Audio captured by an audio sensor is also transmitted by the communication circuitry to the other party. A display of the game system shows a moving video image transmitted from the other party, while a speaker of the game system outputs corresponding audio.

Still other features and advantages of the present invention will become more apparent from the following detailed description when read in conjunction with the accompanying drawings.

BRIEF DESCRIPTION OF THE DRAWINGS

FIG. 14C illustrates another example emulation host system.

DETAILED DESCRIPTION OF EXAMPLE EMBODIMENTS

The present invention is described in the context of exemplary embodiments. However, the scope of the invention is not limited to the particular examples described in the specification. Rather, the description merely reflects certain practical and preferred embodiments, and serves to illustrate the principles and characteristics of the present invention. Those skilled in the art will recognize that various modifications and refinements may be made without departing from the spirit and scope of the invention.

Figure 1A:
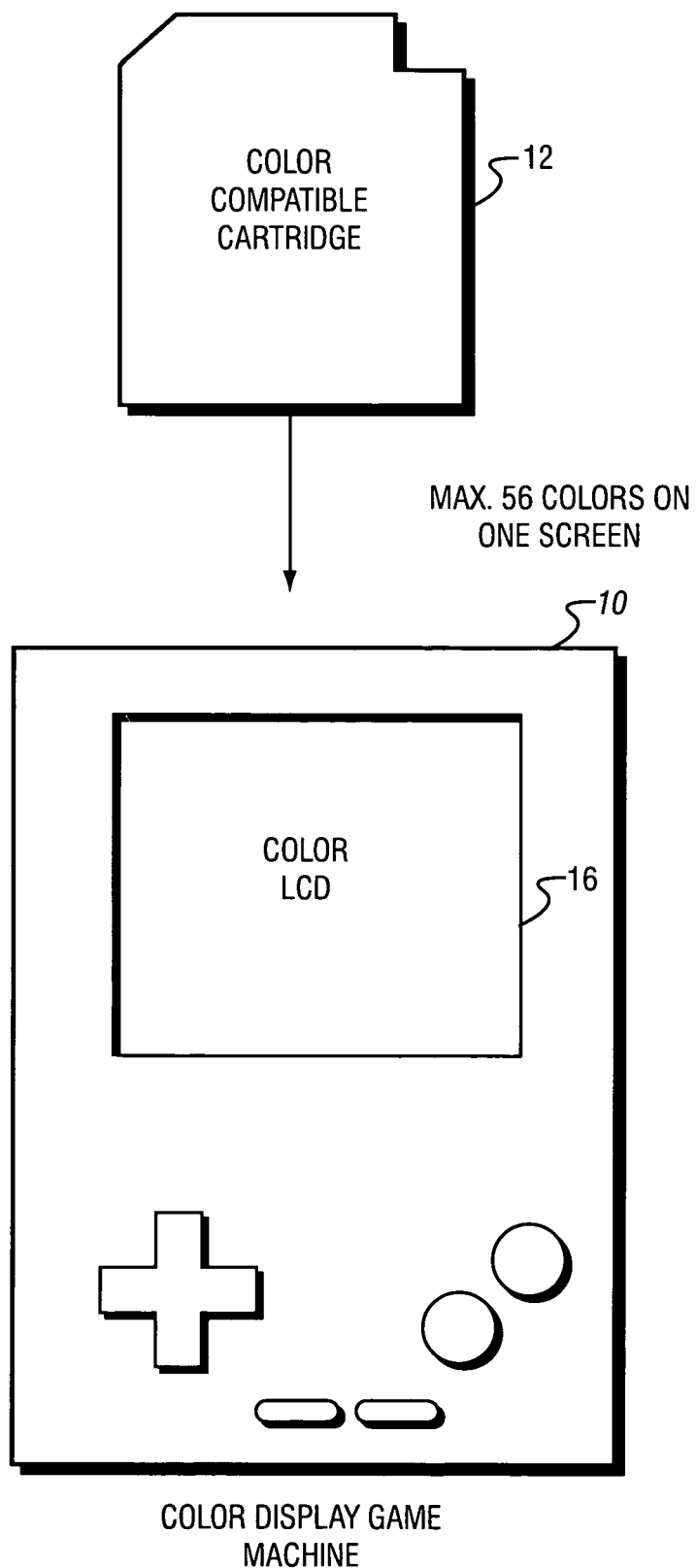
FIG. 1A schematically illustrates a portable game system and a game cartridge selectively attachable to the portable game system.
Figure 1B:
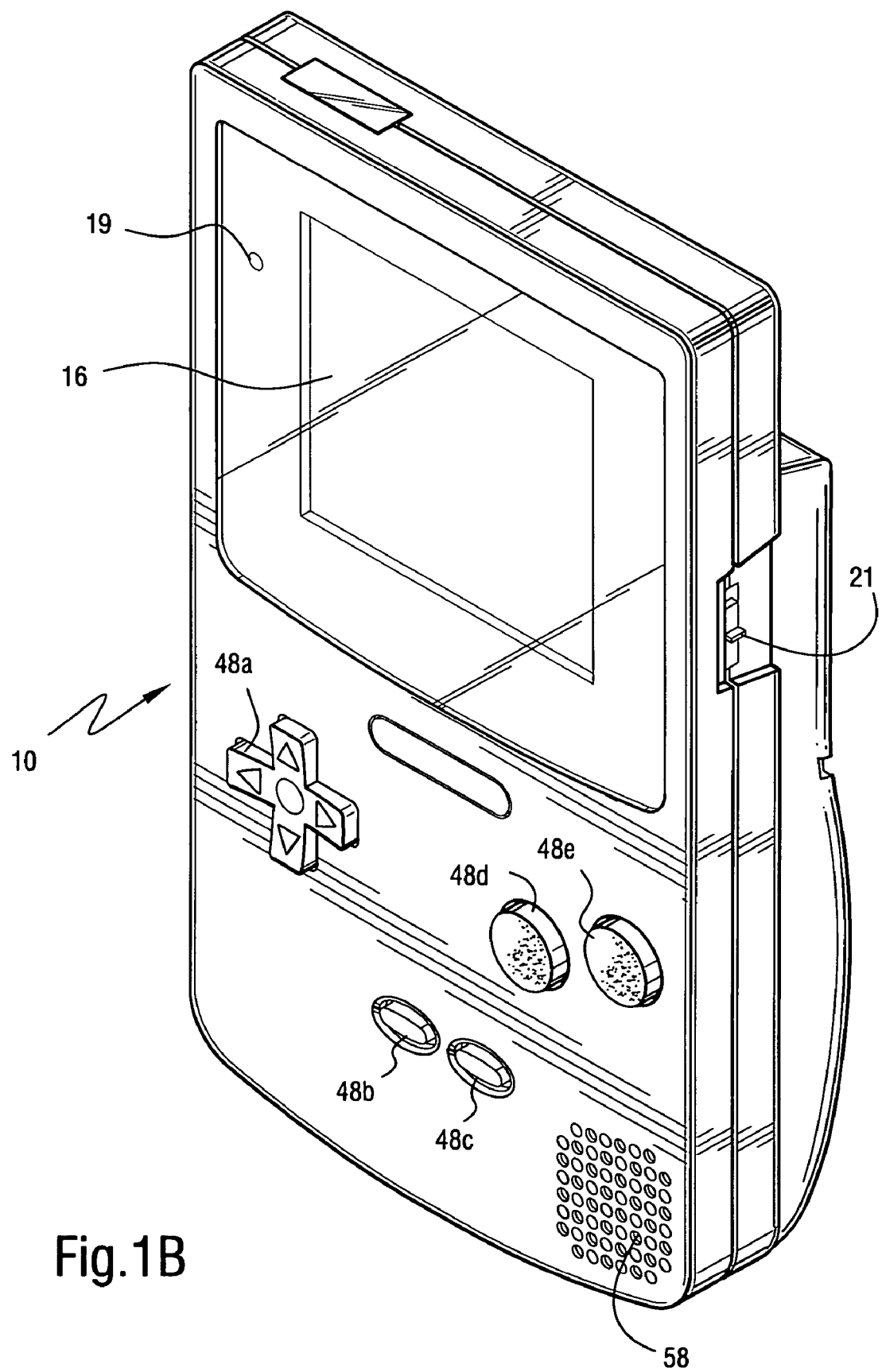
FIG. 1B is a front perspective view of the portable game system shown in FIG. 1A.
Figure 1C:
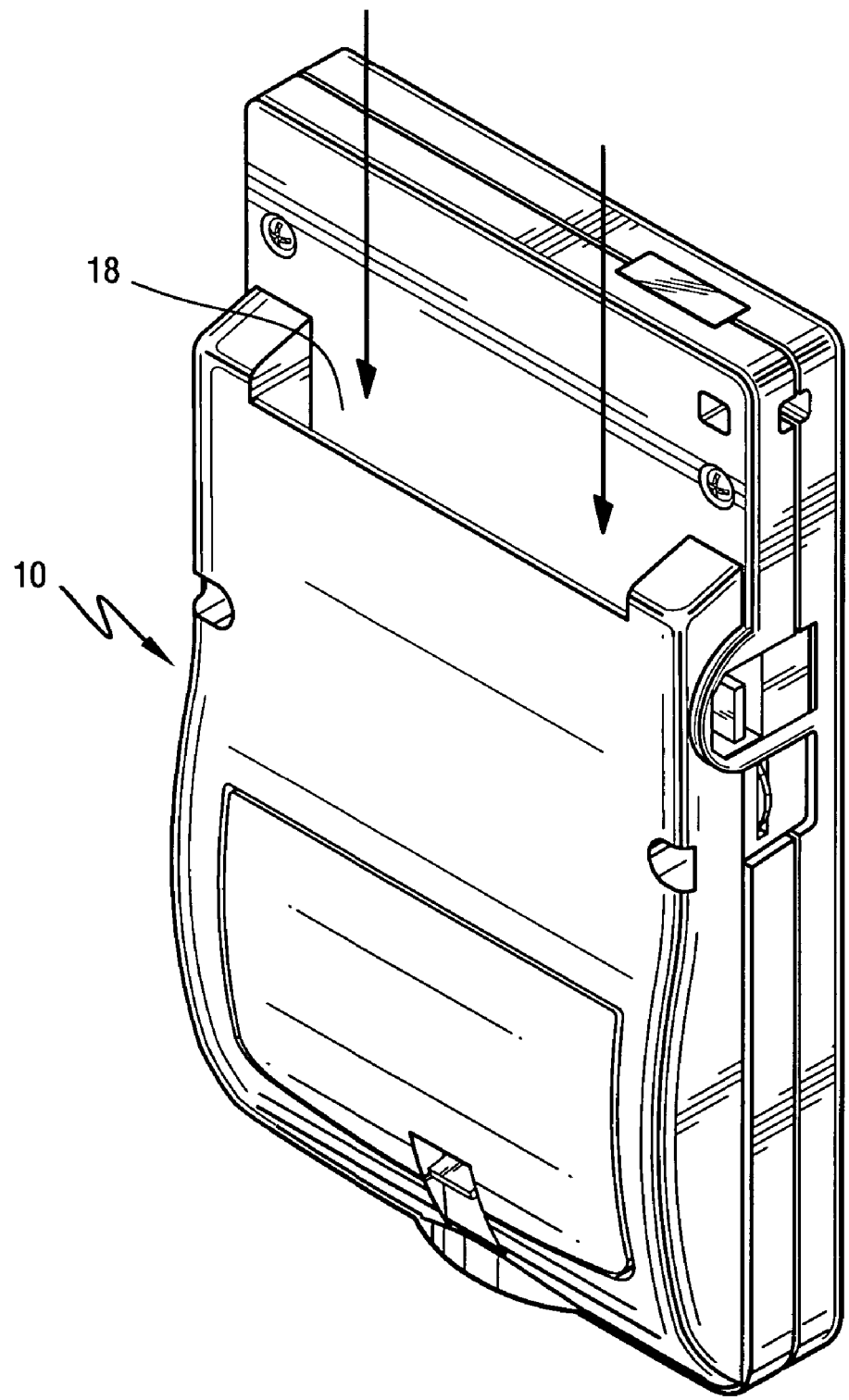
FIG. 1C is a rear perspective view of the portable game system shown in FIG. 1A.

FIGS 1A, 1B, and 1C show a portable (hand-held) color-display game system (hereinafter, referred to simply as "game system") 10 that displays game characters in color on a color liquid crystal display (LCD) 16 when a color-ready game cartridge 12 is selectively inserted into a game cartridge slot 18 (see FIG. 1C). The color LCD 16 displays characters using, for example, up to a maximum of 56 colors if the color-ready game cartridge 12 is inserted into the game system 10. Game system 10 may also be configured to receive monochrome game cartridges (not shown) and to display monochrome characters on LCD 16. Game system 10 may, for example, be a GameBoy® Color game machine.

Figure 2:
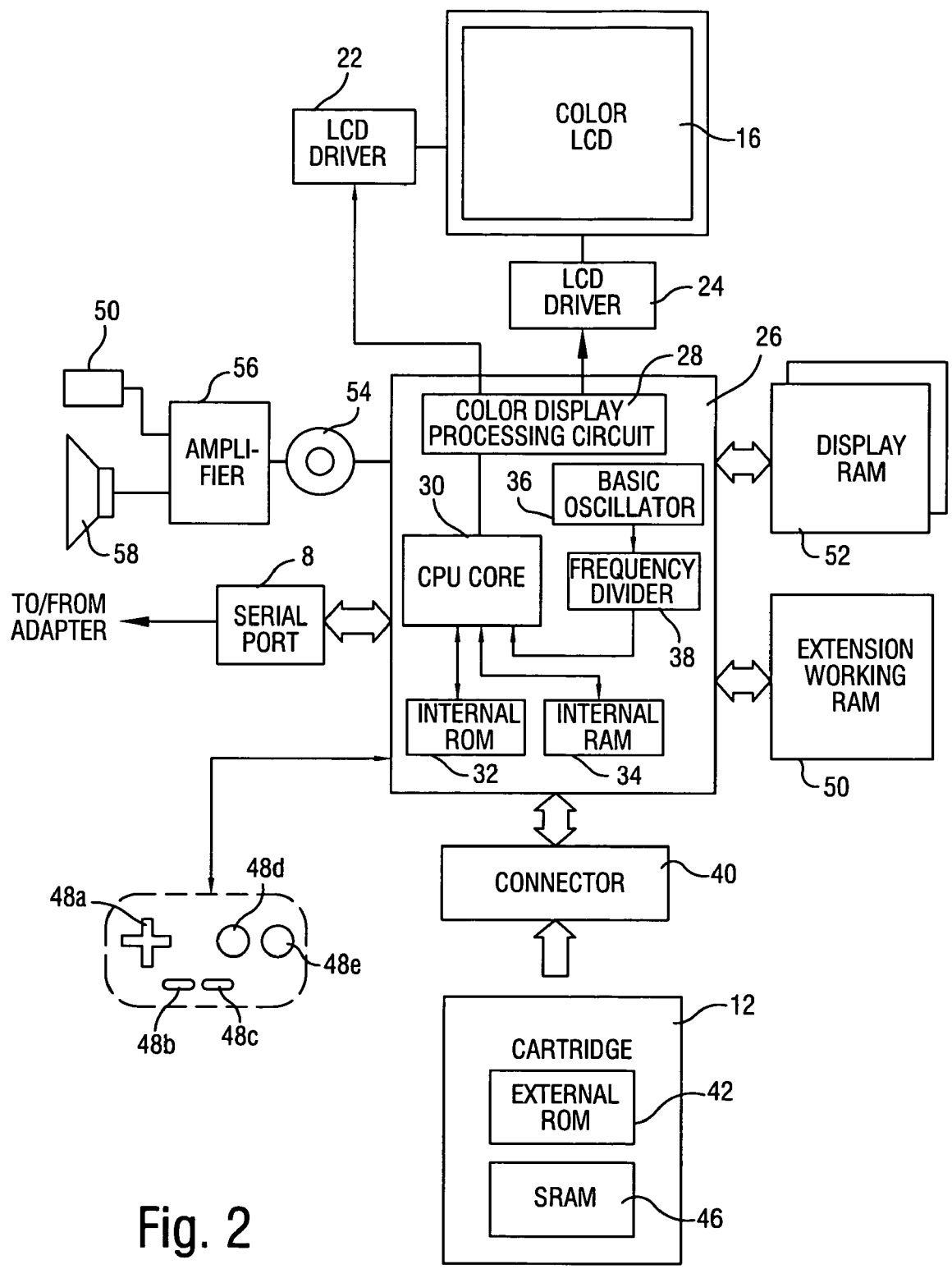
FIG. 2 is an overall block diagram of the game cartridge and the game system shown in FIGS 1A-1C.

With reference to FIG. 2, game system 10 includes color LCD 16 as described above. Color LCD 16 is formed as a dot matrix display and is driven by LCD drivers 22 and 24 to display color images on its screen. LCD driver 22 selectively drives, for example, the rows of the dot matrix display and LCD driver 24 selectively drives, for example, the columns of the dot matrix display. LCD drivers 22, 24 are supplied with color image signals from a color display processing circuit 28 included in a central processing unit (CPU) 26.

CPU 26 further includes a CPU core 30 that is connected to an internal read only memory (ROM) 32 and an internal random access memory (RAM) 34. Internal RAM 34 is used as a work memory of CPU core 30. CPU 26 further includes a basic oscillator 36. Basic oscillator 36 is formed of, for example, a quartz oscillator, and supplies an oscillating signal to a programmable frequency divider 38. Programmable frequency divider 38 divides the oscillating signal from basic oscillator 36 in accordance with frequency division data from CPU core 30, and supplies a divided signal as a clock of CPU core 30.

A connector 40 is connected to CPU 26 by an appropriate bus. Game cartridge 12 shown in FIG. 1 is selectively attachable to connector 40. As will be explained in greater detail below, the digital camera accessory of the present invention is also selectively attachable to connector 40. Game cartridge 12 is preferably in the form of a replaceable memory cartridge insertable into game cartridge slot 18 of game system 10. Game cartridge 12 may be in the form of a plastic housing that encases a printed circuit board. The printed circuit board has a connector defining a number of electrical contacts. When game cartridge 12 is inserted into game cartridge slot 18 of game system 10, the cartridge electrical contacts mate with corresponding "edge connector" electrical contacts within game system 10. This action electrically connects the printed circuit board contained within the plastic housing to the electronics within game system 10. In this example, the printed circuit board of game cartridge 12 at least includes a read-only memory (ROM) 42 and an SRAM 46. ROM 42 stores instructions and other information pertaining to a particular video game. The ROM for one game cartridge 12 may, for example, contain instructions and other information for an adventure game while the ROM of another game cartridge 12 may contain instructions and other information for a car race game, an educational game, etc. To play a game, a user of game system 10 need only plug the appropriate game cartridge into game cartridge slot 18 of game system 10—thereby connecting the cartridge's ROM 42 (and any other circuitry it may contain) to game system 10. This enables the game system circuitry to access information contained within ROM 42, which information controls the game system to play the appropriate video game by displaying images and reproducing sound as specified under control of the ROM game program information. SRAM 46 is used to store data such as game backup data.

CPU 26 is supplied with operation signals from operating keys 48*a*-48*e*. Operating key 48*a* is used, among other things, to move a game character displayed on color LCD 16 in four directions, that is, upward, downward, right and left. Operating key 48*b* is a select key that is used for, for example, game mode selection and the like. Operating key 48*c* is a start key that is used to start playing the game or to temporarily stop the progress of the game. Operating keys 48*d*, 48*e* are push-button switches. By pushing operating keys 48*d*, 48*e*, it is possible to cause various motions of the game characters displayed on color LCD 16, for example, a weapon use, a jump and the like. Operating keys 48*a*-48*e* are disposed in a forward surface of game system 10 as shown in FIG. 1B. Operating keys 48*a*-48*e* are also usable in connection with the digital camera accessory as will be described below. A key matrix (not shown) is provided for sending CPU 26 the operation signals from operating keys 48*a*-48*e* as controller data.

Batteries (not shown) (e.g., 2 AA batteries) provide power for game system 10. A power indicator LED 19 (see FIG. 1B) may dim as the batteries lose their charge, thereby providing a visual indication to the user that new batteries are needed. Game system 10 may also be configured for connection to an AC adapter to permit extended use without batteries.

In accordance with the game program, character data supplied from game cartridge 12 and the controller data from operating keys 48*a*-48*e*, CPU 26 executes data processing and writes display data into a display RAM 52, using an extended RAM 50 when necessary. The display RAM 52 has two banks, that is, a first bank and a second bank, and has, as a whole, a storage area that is greater than the display area of color LCD 16, thereby enabling a scrolling display upward and downward and/or rightward and leftward on the screen of color LCD 16. As a result of the data processing by CPU 26, sound signals to be output are adjusted in level by volume control 54 and amplifier 56, and then outputted to a speaker 58 and/or an earphone jack 60. Sound signals output from speaker 58 and/or earphone jack 60 include game sound effects, voices and music.

Video data (formatted as character data) supplied from a digital camera accessory attached to game system 10 is also writable to display RAM 52 for subsequent display on LCD 16. This video data may be generated from images captured by a camera portion of the digital camera accessory or this video data may be video data transmitted (e.g., via a wireless communication link) from a remote location. In addition, audio data supplied from the digital camera accessory may be output from speaker 58 and/or earphone jack 60. This audio data may be audio data transmitted (e.g., via a wireless communication link) from a remote location. This transmitted audio data may accompany video data transmitted from the same remote location.

Generally speaking, to use game system 10 to play a game, a user selects a game cartridge 12 containing a desired video game, and inserts that game cartridge into game cartridge slot 18 of game system 10, thereby electrically connecting ROM 42 and other cartridge electronics to game system 10. The user then operates a power switch 21 (see FIG. 1B) to turn on game system 10 and operates operating keys 48*a*-48*e* to control video game play. For example, depressing operating key 48*c* may cause the video game to start playing. Actuating operating key 48*a* may cause animated characters to move on color LCD 16 in controllably different directions.

Additional features of game system 10 may be found in U.S. Pat. No. 6,315,669, the contents of which are incorporated herein in their entirety.

A digital camera accessory is provided for game system 10. The digital camera accessory includes an optical sensor (camera) for sensing (capturing) video images. An audio sensor (microphone) for sensing audio may be connected to, or formed integrally with, the digital camera accessory. The digital camera accessory also includes communication circuitry so that game system 10 can be used, for example, as a wireless video telephone. A moving video image captured by the optical sensor is transmitted by the communication circuitry to the other party to the "call." Audio captured by the audio sensor is also transmitted by the communication circuitry to the other party. In "videophone" mode, LCD 16 of game system 10 shows a moving video image transmitted from the other party, while speaker 58 of game system 10 outputs corresponding audio. This "videophone" functionality is selectable when the digital camera accessory is connected to game system 10 via game cartridge slot 18.

The video and audio are preferably transmitted as digital data via a wireless communication link. One convenient band for such transmissions is the Industry, Science and Medical (ISM) band that includes frequencies from 2.4 to 2.488 GHz, although the present invention is not limited in this respect. The video and audio are modulated (e.g., using frequency shift keying) and transmitted using frequency hopped spread spectrum. The bandwidth of the transmitted data is therefore spread within the ISM band.

Figure 3A:
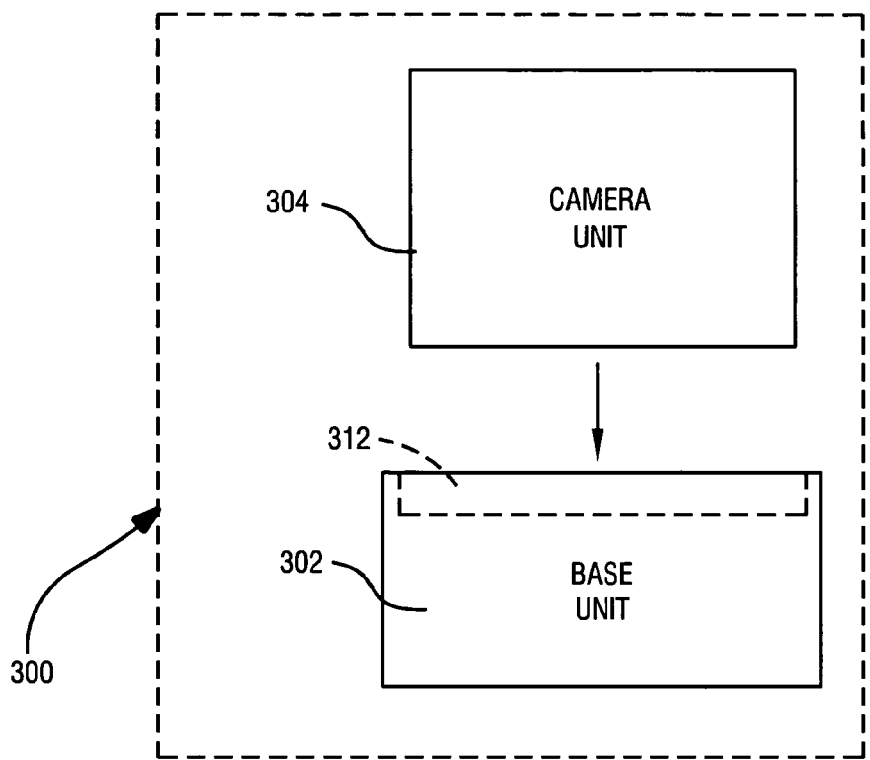
FIG. 3A is a generalized block diagram of a digital camera accessory in accordance with a first embodiment of the present invention.

In a first embodiment shown schematically in FIG. 3A, a digital camera accessory 300 comprises two separable parts: a base unit 302 and a camera unit 304. Base unit 302 connects to game system 10 via game cartridge slot 18. Base unit 302 includes a plastic housing that encases a printed circuit board on which are mounted the base unit components. This printed circuit board of base unit 302 has a connector defining a number of electrical contacts that mate with the corresponding edge connector electrical contacts within the game system 10 when base unit 302 is inserted into game cartridge slot 18 of game system 10.

01 Camera unit 304 is removably attachable to base unit 302. Thus, camera unit 304 may be physically attached to base unit 302 or may be located remotely with respect to base unit 302. To effect the physical attachment, base unit 302 is itself configured with a slot 312 for receiving camera unit 304. This slot 312 is provided with "edge connector" electrical contacts that mate with electrical contacts of camera unit 304. In this way, camera unit 304 may be "piggy-backed" onto base unit 302 when base unit 302 is inserted into the game cartridge slot 18 of game system 10. Alternatively, camera unit 304 is attachable to base unit 302 via a wired connection.

A game system provided with digital camera accessory 300 is operable in one of three different modes.

Figure 3B:
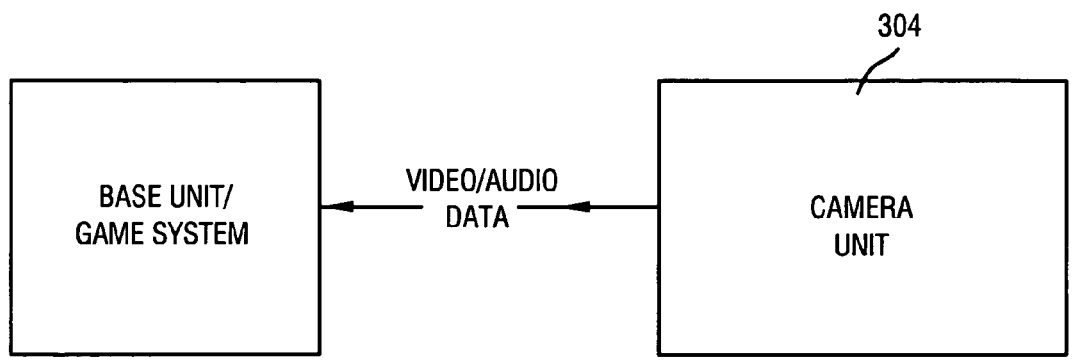
FIG. 3B shows camera unit 304 positioned remotely with respect to the base unit 302/game system 10 combination.

21 With reference to FIG. 3B, in a remote camera mode, base unit 302 is inserted into the game cartridge slot 18 of game system 10 and camera unit 304 is positioned remotely with respect to the base unit 302/game system 10 combination. In this mode, video data and audio data captured by camera unit 304 at the remote position are transmitted by the camera unit to base unit 302. The video and audio data received by base unit 302 are output via LCD 16 and speaker 58 of game system 10.

In a personal communicator mode, base unit 302 is inserted into game cartridge slot 18 of game system 10 and camera unit 304 is physically attached to base unit 302 via the slot provided in the base unit. In this mode, the user may use one or more of operating keys 48a-48e to select one of a plurality of different channels for communication with another similarly configured game system that is also in personal communicator mode. Each "caller" may then view and listen to the other in a manner similar to using a video telephone or a video walkie-talkie. Preferably, once a "call" is established between two parties in personal communicator mode, no other party in the area is able to monitor or establish communication with the called or calling party. In this way, a secure communication link is provided.

In a self-portrait mode, base unit 302 is inserted into game cartridge slot 18 of game system 10 and camera unit 304 is physically attached to base unit 302 via the slot provided in the base unit. In this mode, the user may use one or more of operating keys 48a-48e to cause LCD 16 of game system 10 to display his/her own moving image or some other image captured locally by the digital camera. This mode is useful, among other things, for positioning the game machine to ensure that desired images are transmitted to other parties.

Figure 4:
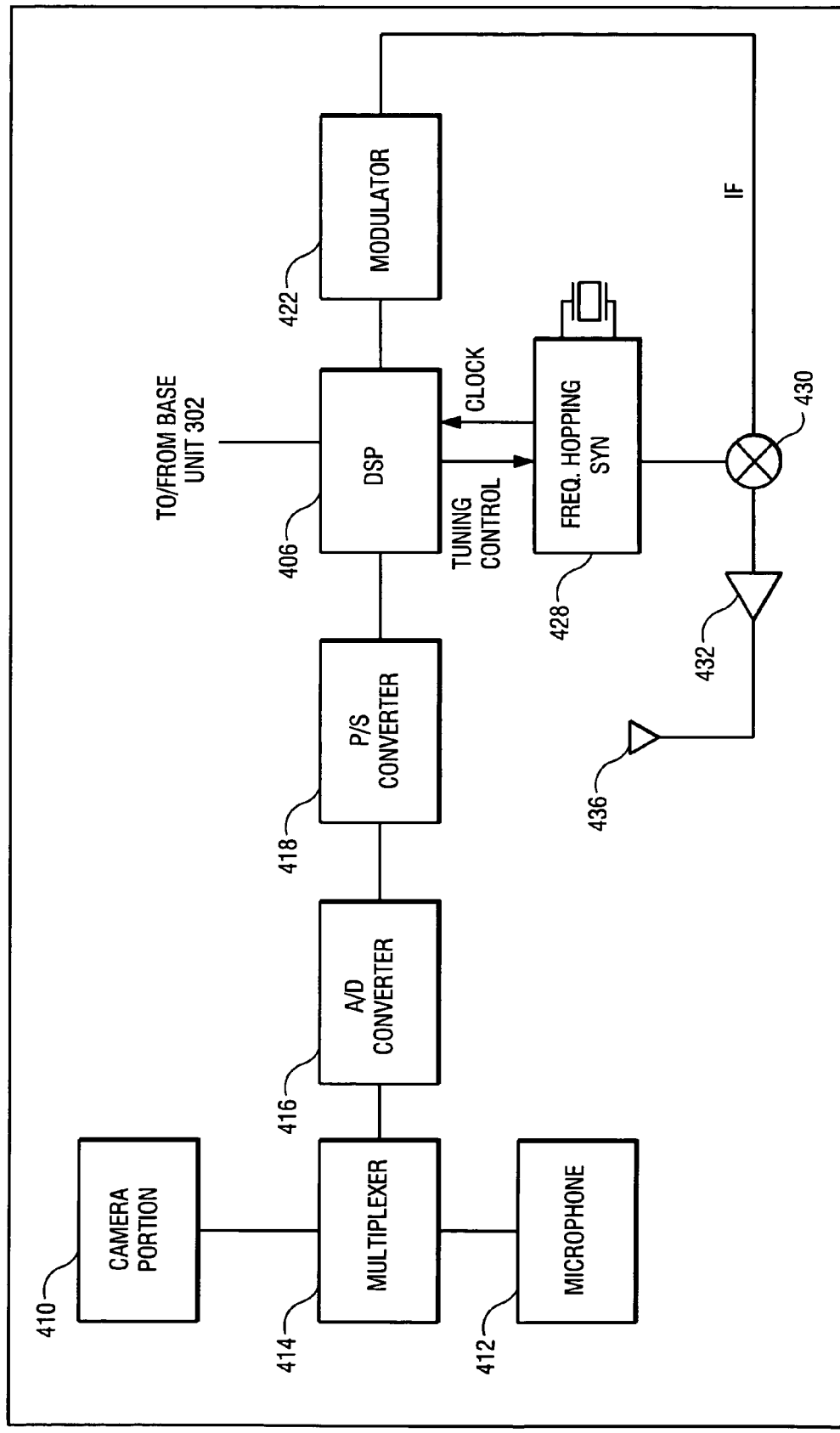
FIG. 4 shows the details of the camera unit of the digital camera accessory shown in FIG. 3.

The details of camera unit 304 are shown in FIG. 4. Camera unit 304 includes a camera portion (optical sensor) 410 for capturing video images. Camera portion 410 may use, for example, CCD or CMOS technology. A microphone 412 is coupled to a multiplexer 414. Microphone 412 may be an external microphone connected via a wired or wireless link to camera unit 304 or microphone 412 may be an internal microphone contained with the housing of camera unit 304. Multiplexer 414 supplies video image signals detected by camera portion 410 and audio signals detected by microphone 412 to an analog-to-digital (A/D) converter 416. A/D converter 416 samples the video signals from camera portion 410 and the audio signals from microphone 412 at a predetermined rate. For example, the video signals may be sampled such that 144×112 pixels are available 10 times a second. In this case, the A/D converter 416 converts video signals at a rate of 161,280 Hz. Taking into account the audio signals, the sampling rate of A/D converter may be 169,280 Hz. A/D converter 416 converts each video and audio sample to an 8-bit value.

A stream of 16-bit data is serially transferred to a DSP 406 via a parallel to serial converter 418. Each 16-bit word comprises an 8-bit pixel and 8 bits of audio. DSP 406 performs image enhancement and data formatting in accordance with its embedded programs. The enhancement algorithm may, for example, be histogram equalization, which modifies an 8-bit pixel value based on the value of each adjacent pixel. The resulting 8-bit pixels are formatted as characters for the game system 10. This character format may, for example, be an 8×8 block of 2-bit pixels. In this case, DSP 406 reduces the 8-bit pixels to 2-bit pixels and packs these pixels into bytes that represent one of the 16 bytes of a character for game system 10. These bytes are sent to the modulator 422 in the same sequential order that game system 10 reads character data from its display RAM 52. DSP 406 also reduces the audio samples from 8-bit samples to 6-bit samples.

Baseband digital data comprising the video and audio data is transferred from DSP 406 to modulator 422. This data is compressed (e.g., at a 1.8:1 ratio) by DSP 406 and is transferred in 256-bit packets. Each packet preferably has an additional 16-bit preamble and a 16-bit postamble. The purpose of the preamble and postamble is to keep the communication synchronized. It is difficult for two transmitting units to synchronize on each other's signal. This is because all the data is digitized and transmitted as packets. In order to synchronize on an individual packet, the DSP program (firmware) looks for a preamble, and then locks on the signal to capture the ensuing data. When no preamble is found for a long period of time (e.g., >5 ms), the DSP program looks for the postamble in order to synchronize on the subsequent packet. This is common in a noisy environment or when the unit is out of range. After a period of time without detecting a preamble or postamble, the channel is relinquished.

The synchronous serial clock rate for the data transfer may be derived as follows:

144×112 pixels=16,128 pixels×2 bits per pixel=32256 bits per frame 32256 bits per frame/8 bits=4032 bytes per frame 4032 bytes per frame×10 frames per second=40,320 bytes per second 40,320 bytes per second+6000 audio samples per second=46,320 bytes/second 46,320 bytes per second/1.8 (compression)=25733.33 bytes per second 25733.33 bytes per second×8 bits per byte=205,866.67 bits per second.

32 bits of preamble and postamble must be added for each 256 bits of data. So the total bit rate is therefore:

25,733.33 (preamble and postamble)+205,866.67=231,600 bits per second.

DSP 406 also controls a frequency hopping synthesizer 428. This frequency hopping control data is sent serially and alters the frequency of synthesizer 428 to correspond with the frequency hopping code.

The baseband digital data from DSP 406 is modulated (e.g., Guassian frequency shift keying) by modulator 422 and the modulated IF data is mixed with the frequency hopping output of synthesizer 428 by a mixer 430. Thus, the data hops pseudo-randomly between different carrier frequencies in the ISM range. The signal is then amplified by amplifier 432 and coupled to antenna 436 for transmission.

Figure 5:
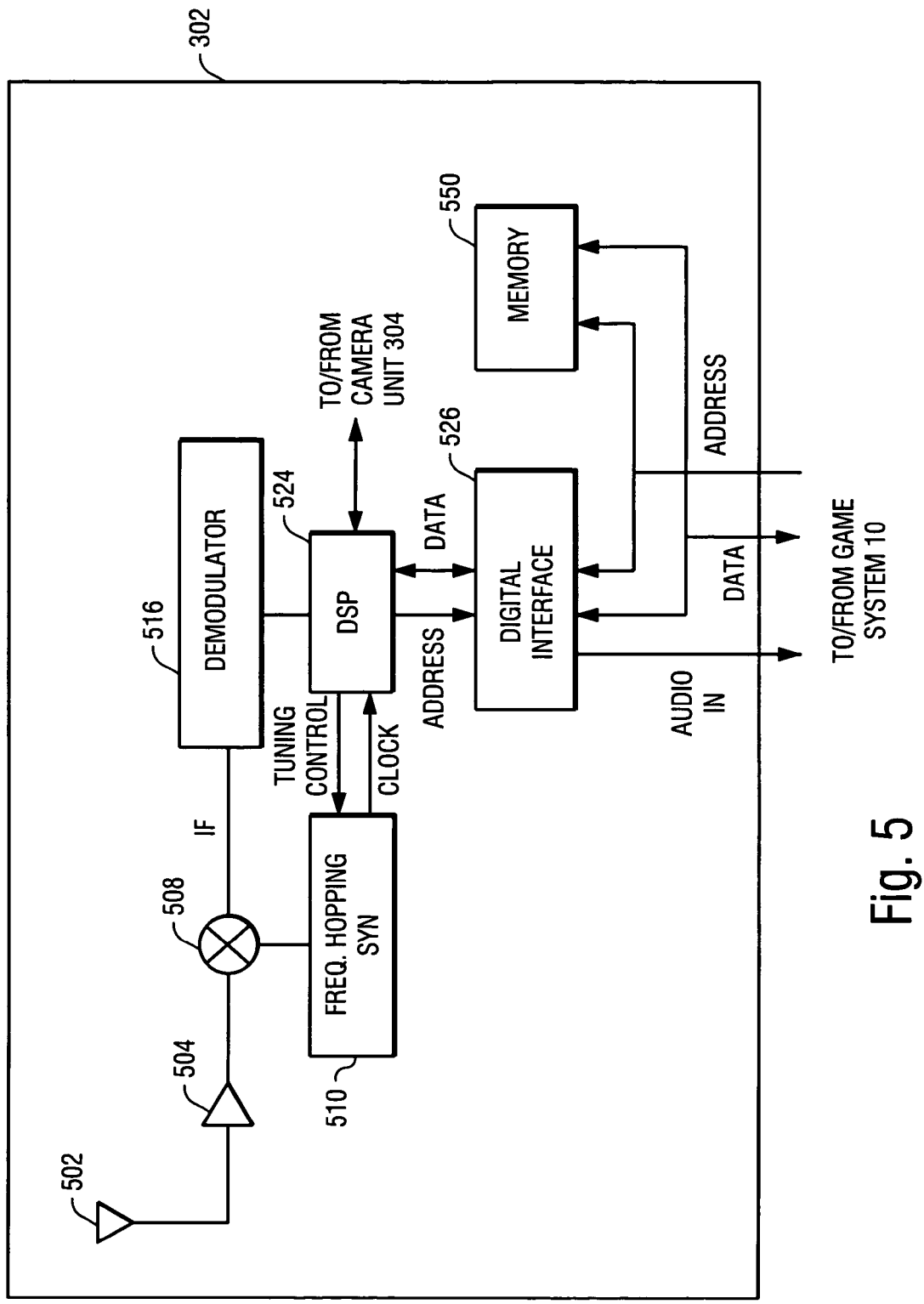
FIG. 5 shows the details of the base unit of the digital camera accessory shown in FIG. 3.

The details of base unit 302 are shown in FIG. 5. Base unit 302 includes an antenna 502 for receiving video and audio data signals. The received signals are amplified by an amplifier 504 and then mixed by a mixer 508 with the output of a frequency hopping synthesizer 510 that is controlled in accordance with the same hopping code as the synthesizer 428 shown in FIG. 4. The output of mixer 508 is an IF signal having the received data. The IF signal is then demodulated by demodulator 516 to produce a baseband data signal that is supplied to a DSP 524. Data is transferred to DSP 524 at a rate of 231,600 Hz, the same as the transfer rate of DSP 406 of camera portion 304.

4032 bytes are transferred from DSP 524 to display RAM 52 of game system 10 via digital interface 526 at a rate of 100 kHz. These 4032 bytes are transferred during NMI and HBLANK periods. The transfer takes 10 microseconds per byte or 40.32 milliseconds. 4032 bytes of display RAM 52 are reserved as a frame buffer. This frame buffer preferably resides at predetermined memory addresses (e.g., D000 through DFBF). The video data transferred to display RAM 52 is displayed on LCD 16. Audio data is transferred to a digital-to-analog converter (not shown) at a rate of 8 kHz. The analog audio data is applied to an audio input connection of game system 10 for output via speaker 58 and/or earphone jack 60.

Digital interface 526 includes a first 1-byte latch for communication from game system 10 to DSP 524; a second 1-byte latch for communication from DSP 524 to game system 10; address decoders for DSP 524 and game system 10; and a state machine for generating handshakes. The first 1-byte latch serves as the communication path from the connectors of game system 10 to DSP 524. The inputs of this 8-bit latch connect to the data lines of game system 10. The outputs connect to the lower eight bits of the data lines of DSP 524. The second 1-byte latch similarly provides the communication path from DSP 524 to game system 10. The state machine provides read and write flags for DSP 524 and game system 10. A device wishing to read or write must first check these flags to determine if read or write is enabled. For example, when DSP 524 transfers data to game system 10, the read flag for game system 10 is low and the write flag for DSP 524 is high. To write to game system 10, DSP 524 writes one byte to the second 1-byte latch. This byte is latched into the second 1-byte latch where the data is available to the data bus of game system 10. The latching causes the state machine to toggle the flags so that game system 10 can read the byte waiting for it.

A memory 550 of base unit 302 stores one or more programs containing instructions accessible to and executable by CPU 26 of game system 10. Memory 550 may be a combination of read only and read/write memory. The programs include one or more programs relating to the digital camera accessory functionality described herein and include, for example, a program providing a user interface by which a user can initiate the digital camera accessory functionality, select one of the operating modes, terminate the functionality, etc. Such programs may be responsive to user inputs via operating keys 48*a*-48*e*. Memory 550 may also store game programs (which may be related or unrelated to the digital camera accessory functionality) that are executable by CPU 26 of game system 10. Memory 550 may also be configured to include a shot image temporary storage RAM as described in U.S. Pat. No. 6,435,969, the contents of which are incorporated herein in their entirety.

There are a plurality (e.g., 16) of channels available to be used within range (~100 m) of the transmitter. Upon powering up the above-described system and selecting "transmit and receive mode" (via an interface provided by a program stored in memory 550), an embedded DSP program (DSP firmware) searches for an available channel. Usually this will be the first channel attempted because of the limited range of the system. Once a channel is established, transmission ensues. Initially, only one unit (the one that established transmission) occupies the channel. Part of the digital information transmitted is control data configured, for example, in the preamble of a packet or a preamble of a group of packets. One datum within this preamble identifies the number of units assigned to the given channel. If this number is 1, then one additional unit may establish connection to this channel. As soon as the second unit makes connection, the preamble datum is updated to 2. The channel is then locked by virtue of a DSP program negotiation algorithm. Since this negotiation is under DSP firmware control, the channel could of course be locked with more than 2 parties connected and the invention is not limited with respect to the number of parties that may connect to the same channel. However, this would require increased bandwidth for each channel to accommodate increased control, video and audio data. Also, the programs in memory 550 would have to handle multiple incoming video/audio signals (split screen or toggle between signals).

In a second embodiment, the digital camera accessory is provided in a single cartridge 600 adapted to be received in game cartridge slot 18 of game system 10. Camera cartridge 600 includes a plastic housing that encases a printed circuit board on which are mounted the components of the camera accessory. This printed circuit board of the camera accessory has a connector defining a number of electrical contacts that mate with the corresponding edge connector electrical contacts within the game system 10 when the camera cartridge is inserted into game cartridge slot 18 of game system 10.

If desired, camera cartridge 600 may itself be provided with a slot for receiving another cartridge such as a game cartridge. The slot of the camera cartridge is provided with "edge connector" electrical contacts that mate with the electrical contacts of the cartridge inserted therein. In this way, a game cartridge 12 may be "piggy-backed" onto the camera cartridge when the camera cartridge is inserted into game cartridge slot 18 of game system 10. The edge connector electrical contacts of the camera cartridge slot are connected via a data bus to those electrical contacts of the camera cartridge that mate with the edge connector electrical contacts of game system 10. In this way, ROM 42 of game cartridge 12 (and any other circuitry game cartridge 12 may contain) is electrically connected to game system 10 and a user may play the game stored on game cartridge 12 even when camera cartridge 600 is attached to game system 10. It is of course also possible for game cartridge 12 to be configured with a slot for receiving camera cartridge 600.

Figure 6:
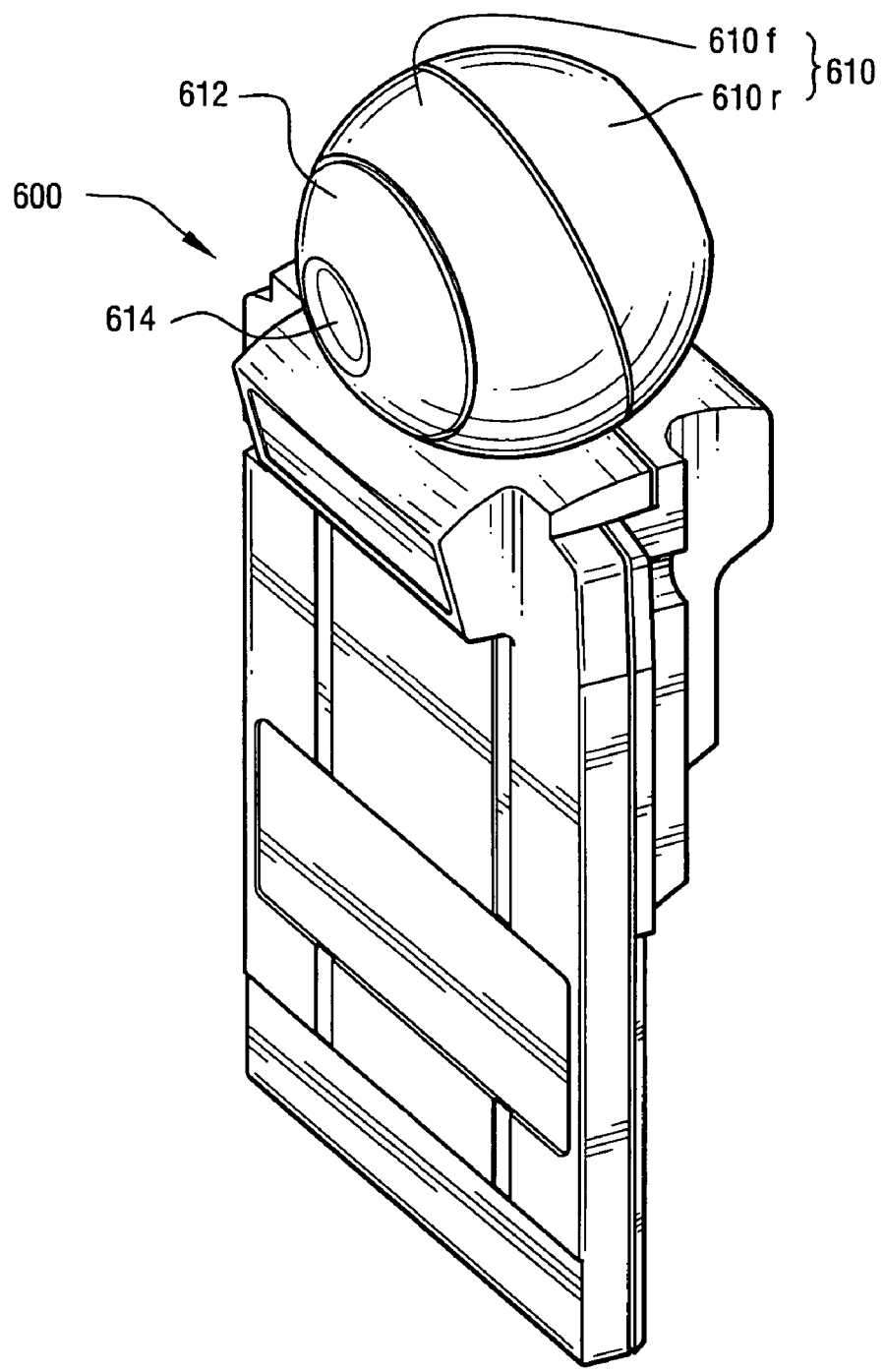
FIGS. 6 and 7 are external perspective views showing a digital camera accessory in accordance with a second embodiment of the present invention.
Figure 7:
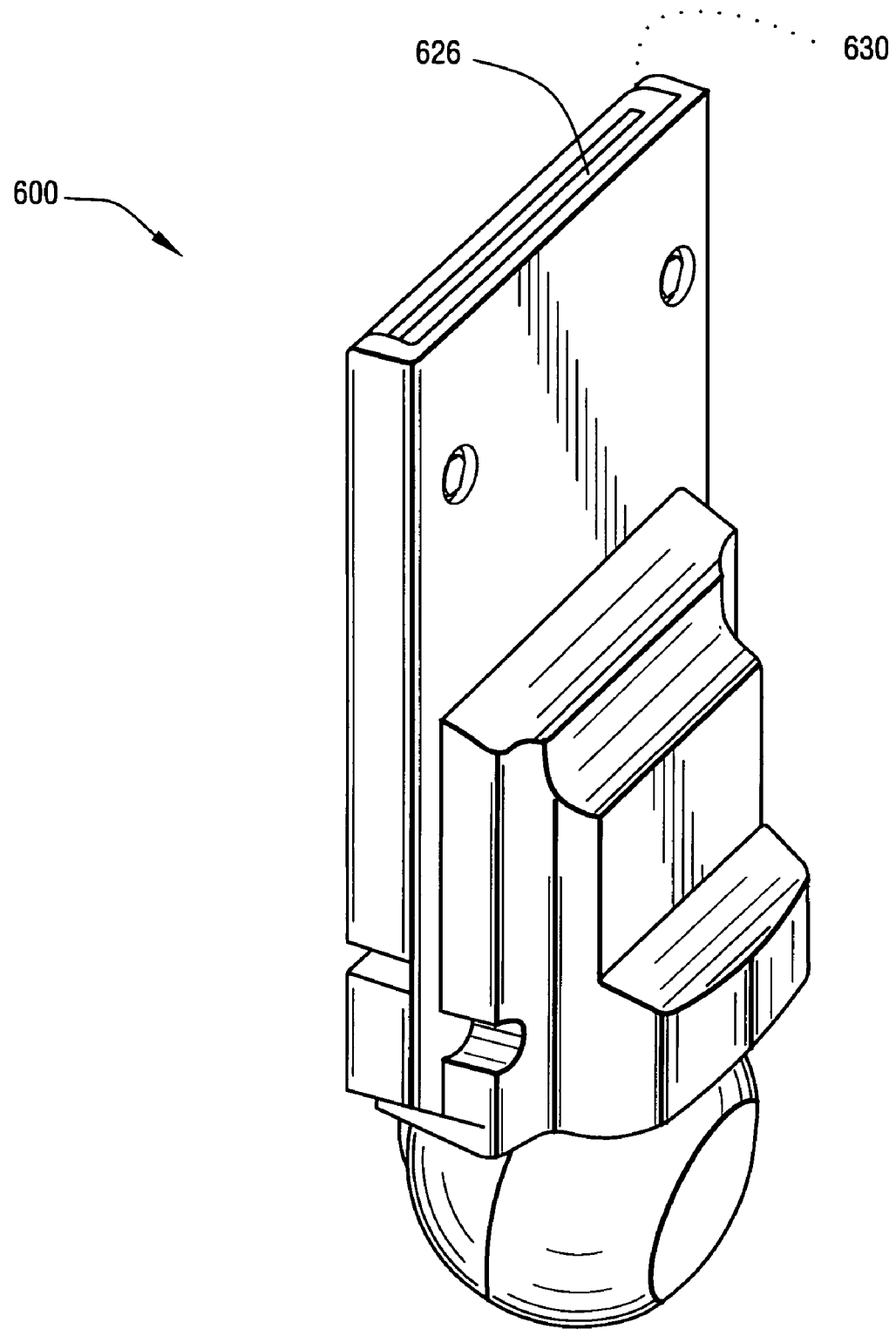
Figure 8:
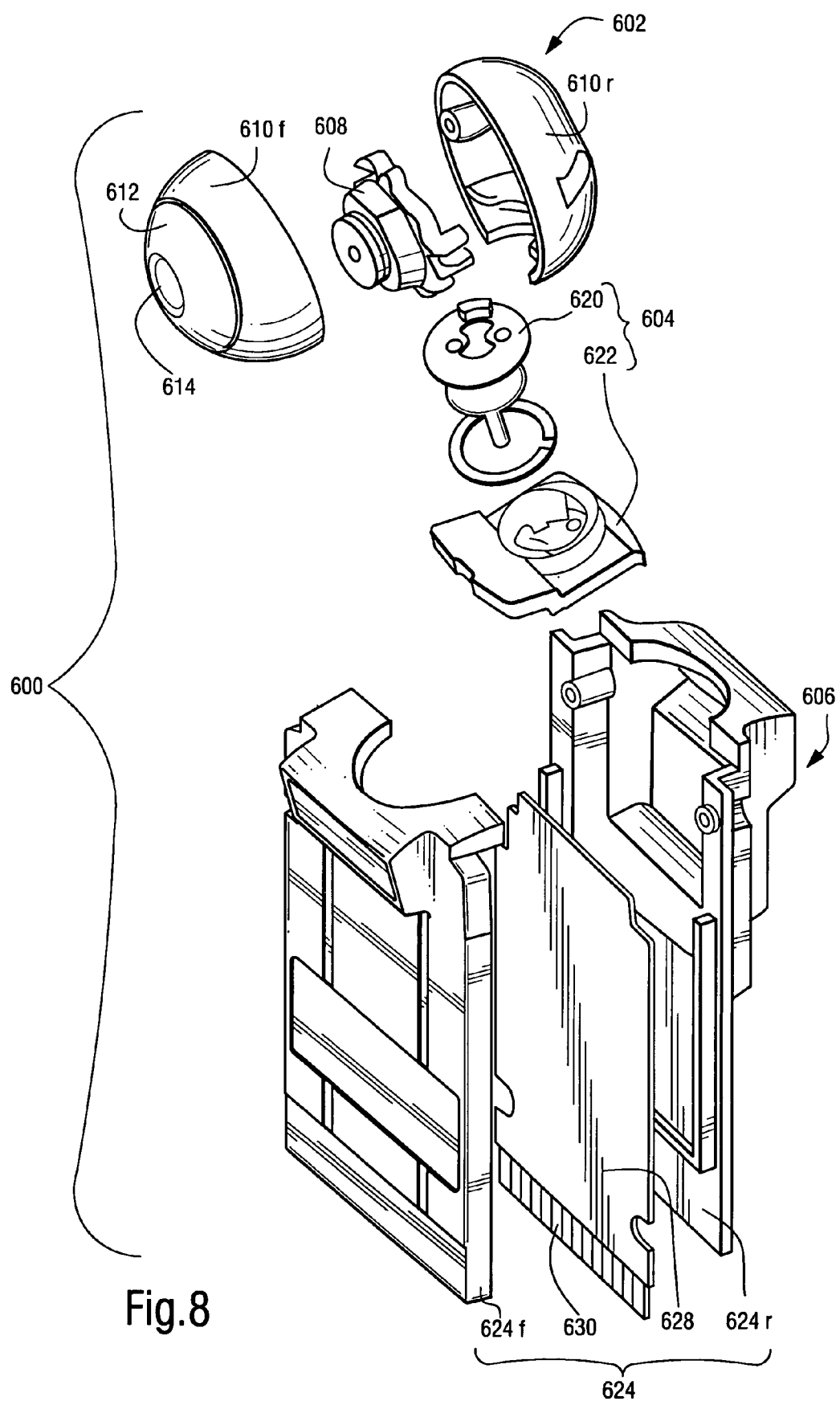
FIG. 8 is an exploded view showing the digital camera accessory of FIGS. 6 and 7.

By way of example, but not limitation, digital camera cartridge 600 may be physically configured along the lines described in U.S. Pat. No. 6,435,969. FIGS. 6 and 7 are external perspective views showing the structure of digital camera cartridge 600. FIG. 8 is an exploded view showing that digital camera cartridge 600 includes a camera portion 602, a camera supporting portion 604, and a cartridge body portion 606. Camera portion 602 is shown as including an image detecting device (sensor) 608 that is encased by generally spherical case 610 having a front portion 610f and a rear portion 610r. The front portion 610f of spherical case 610 includes a front panel 612 in which an opening 614 is provided for allowing images to be incident on a lens (not shown) of optical sensor (camera) 608. Support portion 604 comprises a camera supporting body 620 and a fixed supporting body 622. Support portion 604 is configured to rotatably support camera portion 602 such that camera portion 602 is rotatable between a "forward-looking" direction (i.e., the direction of the outward normal from the outer surface of a front portion 624f of cartridge body portion 624) and a "rearward-looking" direction (i.e., the direction of the outward normal from the outer surface of a rear portion 624r of cartridge body portion 624). Support portion 604 further supports camera portion 602 so that the angle between the optical axis and the outward normal from the outer surface of front portion 624f of cartridge body portion 624 when the camera portion is positioned in the forward-looking direction is between about 10 to 45° and is preferably about 15°. In this way, for example, camera portion 602 is conveniently oriented to detect and capture the face of a user watching display 16 of game system 10.

As most clearly seen in FIG. 7, an opening 626 is formed at the lower portion of digital camera cartridge 600. Digital camera cartridge 600 houses a printed circuit board 628. A plurality of terminals 630 is arranged on the lower portion of printed circuit board 628 to electrically connect components mounted on the board to connector 40 of game system 10. Terminals 630 are connected to the electrical components mounted on printed circuit board 628 in a suitable circuit pattern.

Figure 9:
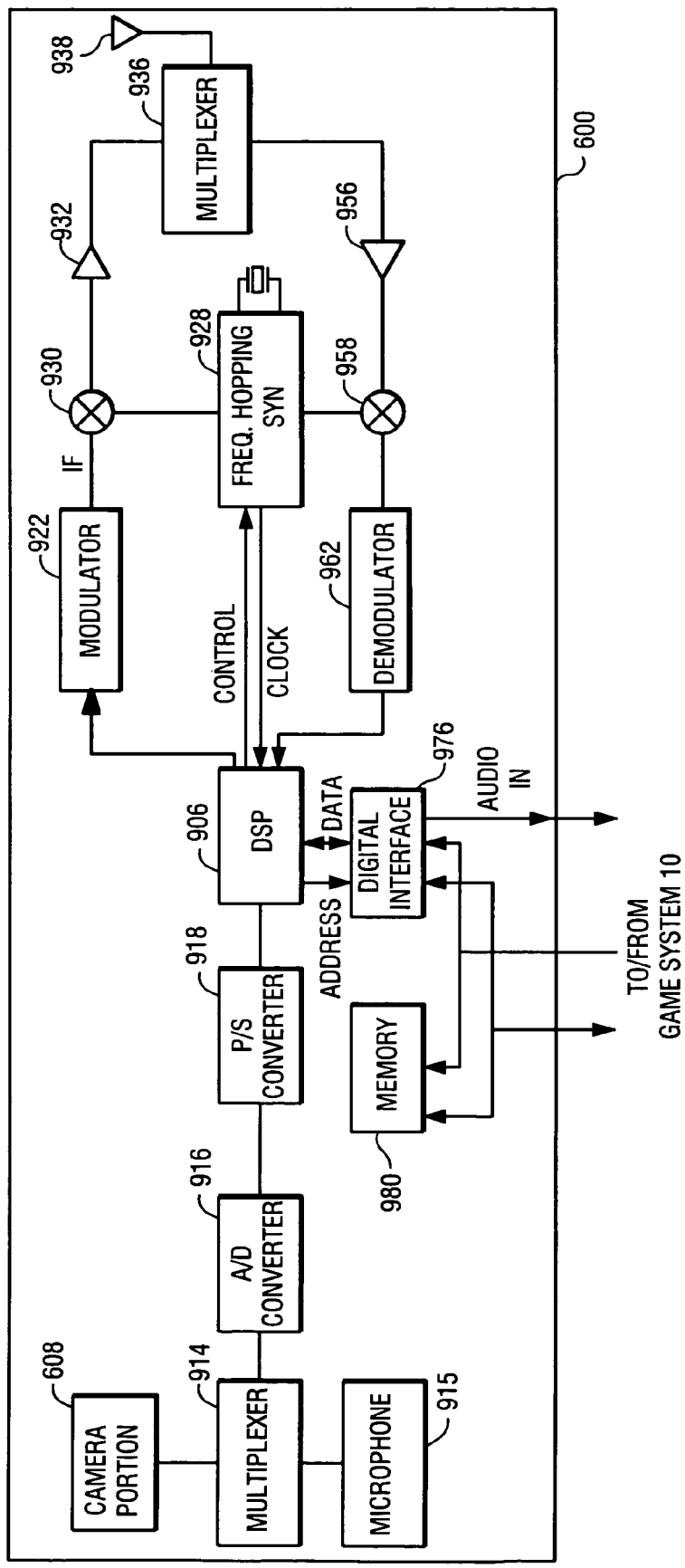
FIG. 9 is a block diagram of the electronic circuitry for the digital camera accessory of FIGS. 6 and 7.

FIG. 9 is a generalized block diagram showing the electrical structure of digital camera cartridge 600. Camera cartridge 600 includes a camera portion 608 for capturing images. Camera portion 608 may, for example, use CCD or CMOS technology. A microphone 912 is coupled to a multiplexer 914. Microphone 912 may be an external microphone or an internal microphone contained within the housing of camera cartridge 600. Multiplexer 914 supplies video image signals detected by camera portion 608 and audio signals detected by microphone 912 to an A/D converter 916. A/D converter 916 samples the video signals from camera portion 608 and audio signals from microphone 912 at a predetermined rate as discussed above with reference to FIG. 4. Each video and audio sample is converted to an 8-bit value.

A stream of 16-bit data is serially transferred from A/D converter 916 to a DSP 906 via a parallel to serial converter 918. Each 16-bit word comprises an 8-bit pixel and 8 bits of audio. DSP 906 performs image enhancement and data formatting in accordance with its embedded programs. The enhancement algorithm may, for example, be histogram equalization, which modifies an 8-bit pixel value based on the value of each adjacent pixel. The resulting 8-bit pixels are formatted as characters for the game system 10. The character format may, for example, be an 8×8 block of 2-bit pixels. In this case, DSP 906 reduces the 8-bit pixels to 2-bit pixels and packs these pixels into bytes that represent one of the 16 bytes of a character for game system 10. These bytes are sent to modulator 922 in the same sequential order that game system 10 reads character data from its display RAM 52. DSP 906 also reduces the audio samples from 8-bit samples to 6-bit samples.

Baseband digital information comprising the video and audio data is transferred from DSP 606 to modulator 922. This data is compressed (e.g., at a 1.8:1 ratio) by DSP 906 and is transferred in 256-bit packets. Each packet preferably has an additional 16-bit preamble and a 16-bit postamble. The purpose of the preamble and postamble is to keep the communication synchronized as discussed above. The clock rate for the data transfer is 231,600 Hz as also discussed above.

DSP 906 also controls a frequency hopping synthesizer 928. This frequency hopping control data is sent serially and alters the frequency of synthesizer 928 to correspond with the frequency hopping code. The baseband digital data from DSP 906 is modulated (e.g., Guassian frequency shift keying) by modulator 922 and the modulated IF data is mixed with the frequency hopping output of synthesizer 928 by a mixer 930. Thus, the data hops pseudo-randomly between different carrier frequencies in the ISM range. The signal is then amplified by amplifier 932 and coupled via multiplexer 936 to antenna 938 for transmission.

Antenna 938 also receives video and audio data signals. The received signals are supplied via multiplexer 936 to an amplifier 956. The amplified signal is then mixed by a mixer 958 with the output of frequency hopping synthesizer 928 that is controlled in accordance with the hopping code. The output of mixer 958 is an IF signal having the received data. The IF signal is then demodulated by demodulator 962 to produce a baseband data signal that is supplied to DSP 906 at a rate of 231,600 Hz.

4032 bytes are transferred from DSP 906 to display RAM 52 of game system 10 via digital interface 976 at a rate of 100 kHz. Digital interface 976 is configured in the same manner as digital interface 526 described above in connection with FIG. 5. These 4032 bytes are transferred during NMI and HBLANK periods. The transfer takes 10 microseconds per byte or 40.32 milliseconds. 4032 bytes of display RAM 52 is reserved as a frame buffer. This frame buffer preferably resides at predetermined memory addresses (e.g., D000 through DFBF). The video data transferred to display RAM 52 is displayed on LCD 16. Audio data is transferred to a digital-to-analog converter (not shown) at a rate of 8 kHz. The analog audio data is applied to an audio input connection of game system 10 for output via speaker 58 and/or earphone jack 60.

Digital camera cartridge 600 also includes a memory 980 for storing one or more programs containing instructions accessible to and executable by CPU 26 of game system 10. Memory 980 may be a combination of read only and read/write memory. The programs include one or more programs relating to the digital camera accessory functionality as explained above and may also include one or more games programs (which may be related or unrelated to the digital camera accessory functionality) executable by CPU 26 of game system 10.

Memory 980 may also be configured to include a shot image temporary storage RAM as described in the above-mentioned U.S. Pat. No. 6,435,969.

A game system 10 provided with a digital camera cartridge 600 is operable in, for example, a personal communicator mode and a self-portrait mode. For the personal communicator mode, digital camera cartridge 600 is inserted into game cartridge slot 18 of game system 10 and the user selects the personal communicator mode via the user interface (e.g., using one or more of operating keys 48a-48e). The user then selects one of a plurality of different channels for communication with another similarly configured game system that is also in personal communicator mode. Each caller may then view and listen to the other in a manner similar to using a video telephone or a video walkie-talkie. The user may also select a self-portrait mode in which the LCD 16 of game system 10 displays his/her own moving image or some other moving image captured locally by the digital camera accessory.

Figure 10:
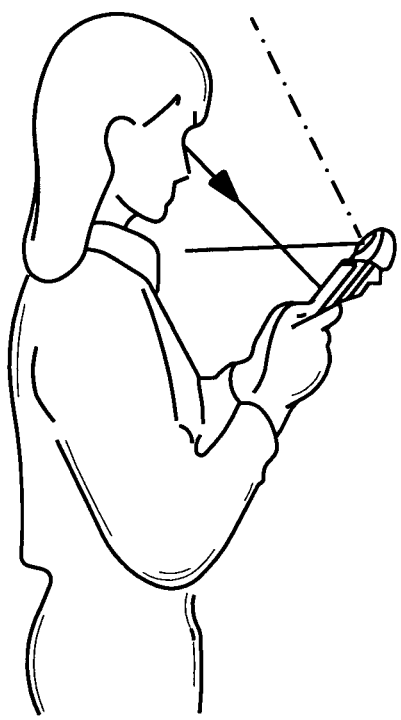
FIG. 10 is a diagram showing one use of the digital camera accessory of the present invention when connected to game system 10.
Figure 11:
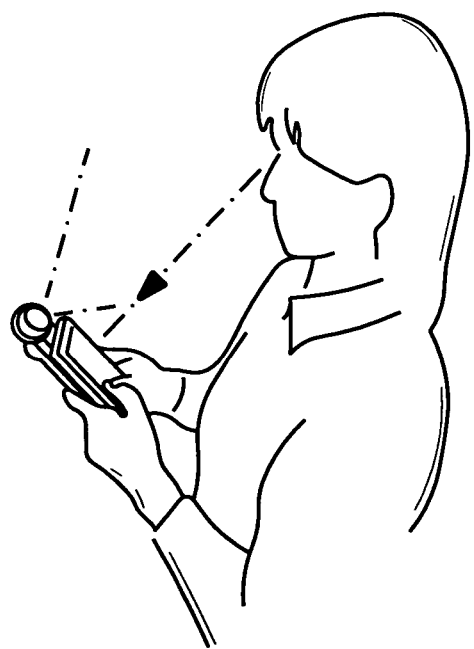
FIG. 11 is another view of the diagram shown in FIG. 10.
Figure 12:
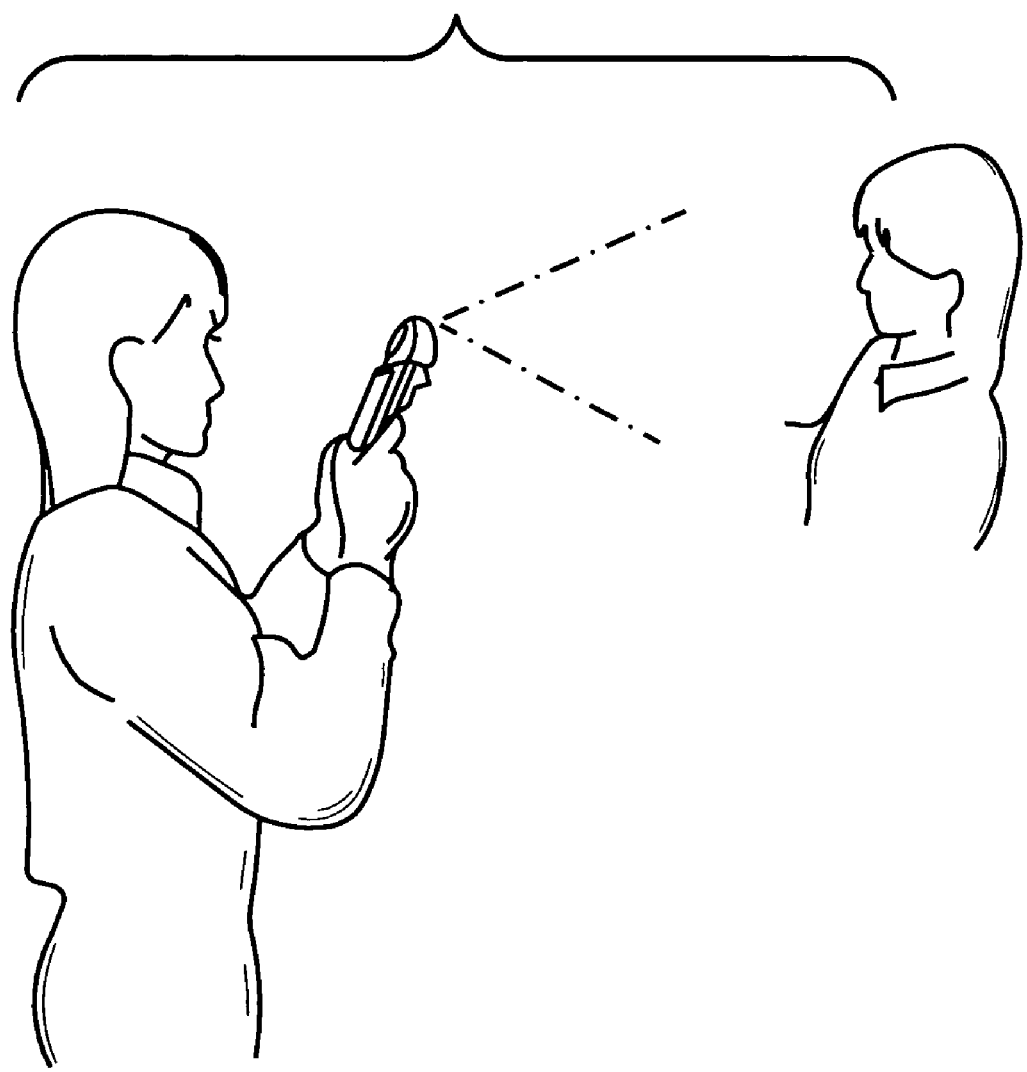
FIG. 12 is a diagram showing another use of the digital camera accessory of the present invention when connected to game system 10.

FIGS. 10 through 12 are diagrams showing some illustrative uses of the digital camera accessory. In particular, FIGS. 10 and 11 show a state in which a user captures moving images of himself/herself and/or images behind himself/herself. In the self-portrait mode, these captured images are displayed on LCD 16. In the personal communicator mode, these images are transmitted to another party. If the user speaks and the digital camera accessory is configured with either an external or internal microphone, the audio may also be transmitted to the other party. At the same time, in the personal communicator mode, the user can look at LCD 16 and see moving images transmitted from the other party, as well as listen via speaker 58 to audio transmitted from the other party. FIG. 12 shows a state in which the user captures moving images in front of himself/herself. These images (and accompanying sound) may be transmitted to another party (personal communicator mode) or may be viewed on LCD 16 (self-portrait mode). Although FIG. 12 shows such images as being captured while a user holds the game machine, it will be apparent that the game machine with the digital camera accessory may simply be left by a user at a particular location. Of course, in accordance with the first embodiment, camera unit 304 may be left at some location to transmit images and/or sounds to a user at some other location having a game system 10 and a base unit 302 attached thereto.

When the user holds game system 10, and camera portion 602 is rotated to point to the forward-looking direction (i.e., the outward direction from the front surface of game system 10), as shown in FIGS. 10 and 11, the face and the surroundings of the user are captured by camera portion 602, and this captured image (e.g., the face and the surroundings of the user) (along with any sounds captured by a microphone) may be transmitted to a similarly configured game system. When the user wants to capture images of other persons or objects, camera portion 602 is rotated to point in the rearward-looking direction (i.e., the outward direction from the rear surface of game system 10). As a result, the user can capture images of other persons and objects, and these images may be transmitted to a similarly configured game system. By providing a predetermined input to game system 10 via some combination of one or more of operating keys 48a-48e, the user can choose a channel for transmitting the images captured by camera portion 602 to a similarly configured game system.

Figure 13:
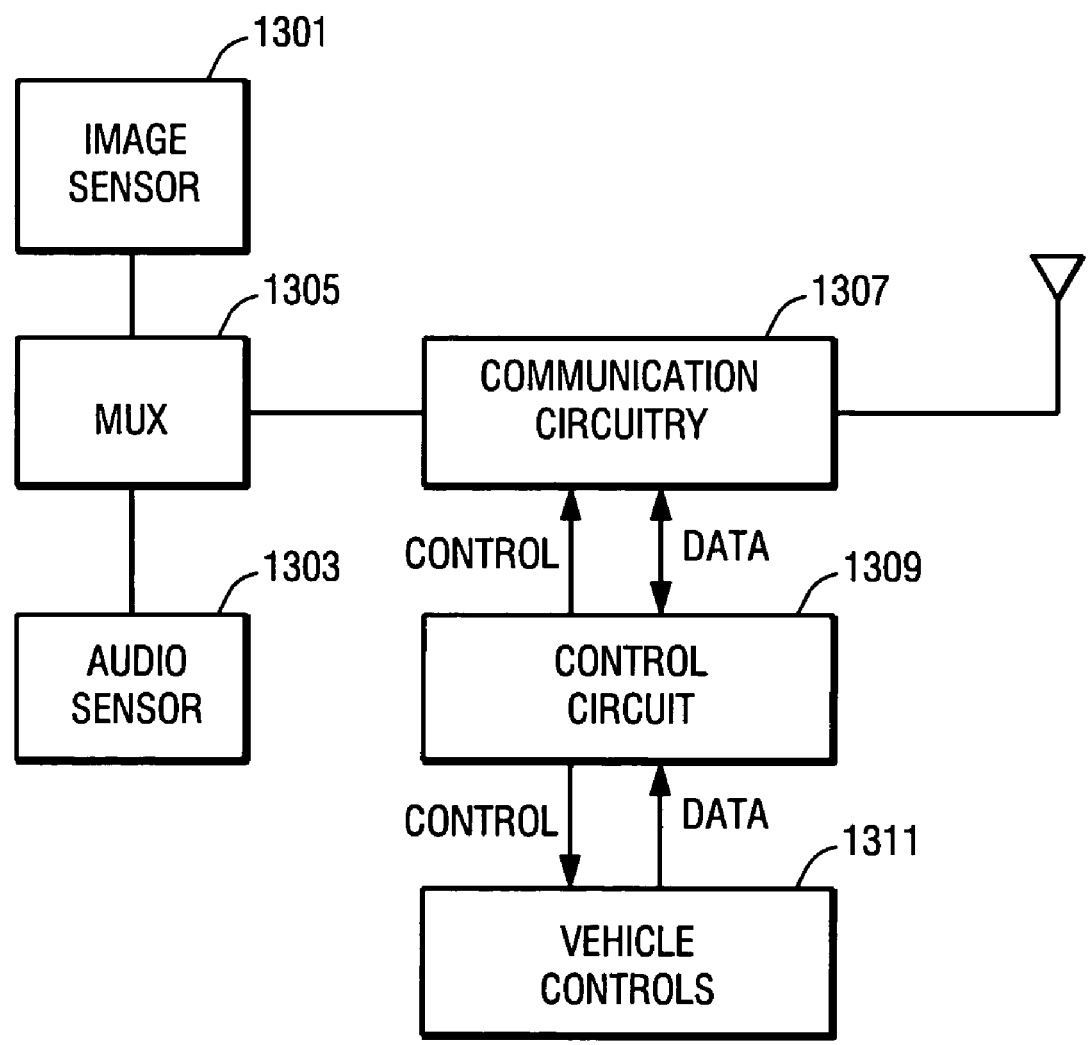
FIG. 13 is a simplified block diagram of a remotely controllable vehicle usable as part of a game system in accordance with the present invention.

The system and method described herein has many applications. For example, the system and method can be applied to a game in which a user remotely controls a vehicle (such as a car, truck, plane, boat, etc.) equipped with an image and/or audio detector, a control circuit, and a wireless transmitter and receiver. More specifically, as shown in the simplified block diagram of FIG. 13, the remotely controllable vehicle includes an image sensor 1301 and an audio sensor 1303. The images and sounds from these sensors are multiplexed by multiplexer 1305 and supplied to a communication circuit 1307 (including a transmitter and a receiver) for wirelessly transmitting the images and sounds to a game system configured with a digital camera accessory as described above. These images and/or audio are output via the LCD 16 and/or speaker 58 of game system 10, respectively. Based on the output images and audio, the player inputs commands for controlling the vehicle via operating keys 48a-48e. These commands may include commands for controlling the speed and direction of the vehicle and are wirelessly transmitted from the game system to the vehicle. The communication circuit 1305 receives the commands transmitted from the game system and provides them to a vehicle control circuit 1309 (e.g., microprocessor) that controls the vehicle controls 1311 in response thereto. The vehicle controls may include speed controls, direction controls, etc.

Other applications include pretend spy games in which a portable game system provided with a digital camera accessory as described herein is positioned to capture images of friends that are, for example, playing in another room of a house. In the case of the first embodiment of the present invention, this could involve positioning the camera unit 304 remotely from a game system to which base unit 302 is attached. The "pretend spy" can then watch images and listen to audio captured by camera unit 304 and transmitted to base unit 302. In the case of the second embodiment, the pretend spy game could involve positioning one portable game system 10 configured with a digital camera accessory 600 remotely (e.g., in another room of a house) with respect to another portable game system 10 configured with a digital camera accessory 600. Here again, the "pretend spy" can watch images and listen to audio captured by the game system positioned in the other room. For this game, it may be desirable to provide a "receive only" operation in which the "spy's" image is not transmitted to the other game system.

In personal communicator mode, the game systems described herein may also be used by students to communicate with each other in school.

The game systems described herein may also be used as baby monitors.

Other applications are also envisioned. For example, a game system with a camera may transmit captured images to two other similarly equipped game systems. These two game systems each receives the images and displays them on their respective LCDs 16. However, rather than being in audio communication with the game system transmitting the images, these two game systems can be configured for audio communication with each other so that they can discuss the received images.

The personal communicator mode may also provide for a "privacy" feature in which a party on a call may temporarily stop the transmission of video images to the other party while continuing to transmit audio.

Although the above description is in terms of selectively attaching a digital camera cartridge to a portable game system, it will be apparent that the principles of the present invention may be adapted to other types of game systems including game consoles such as the N64® game system.

Other Example Compatible Implementations

Certain of the above-described system components could be implemented as other than the home video game console system or hand-held system configurations mentioned and described above.

An emulator system, for example, might include software and/or hardware components that emulate or simulate some or all of hardware and/or software components of the system for which the application software was written. For example, the emulator system could comprise a general-purpose digital computer such as a personal computer, which executes a software emulator program that simulates the hardware and/or firmware of the system. The emulator could also comprise a personal digital assistant (PDA) that simulates the hardware and/or firmware of the system. An emulator may execute the game software so that a particular game functions and/or appears somewhat differently from how it functions and/or appears on its intended platform. Thus, the emulator may show a color game in monochrome or a play a game without its accompanying sound. Emulation as used herein is intended to include emulation that results in these and other such differences in functions and/or appearance.

Some general purpose digital computers (e.g., IBM or MacIntosh personal computers and compatibles) are now equipped with 3D graphics cards that provide 3D graphics pipelines compliant with DirectX or other standard 3D graphics command APIs. They may also be equipped with stereophonic sound cards that provide high quality stereophonic sound based on a standard set of sound commands. Such multimedia-hardware-equipped personal computers running emulator software may have sufficient performance to approximate the graphics and sound performance of the system. Emulator software controls the hardware resources on the personal computer platform to simulate the processing, graphics, sound, peripheral and other capabilities of the portable game machine platform for which the game programmer wrote the game software. Similarly, PDAs running emulator software may have sufficient performance to approximate the graphics and sound performance of the system.

Figure 14A:
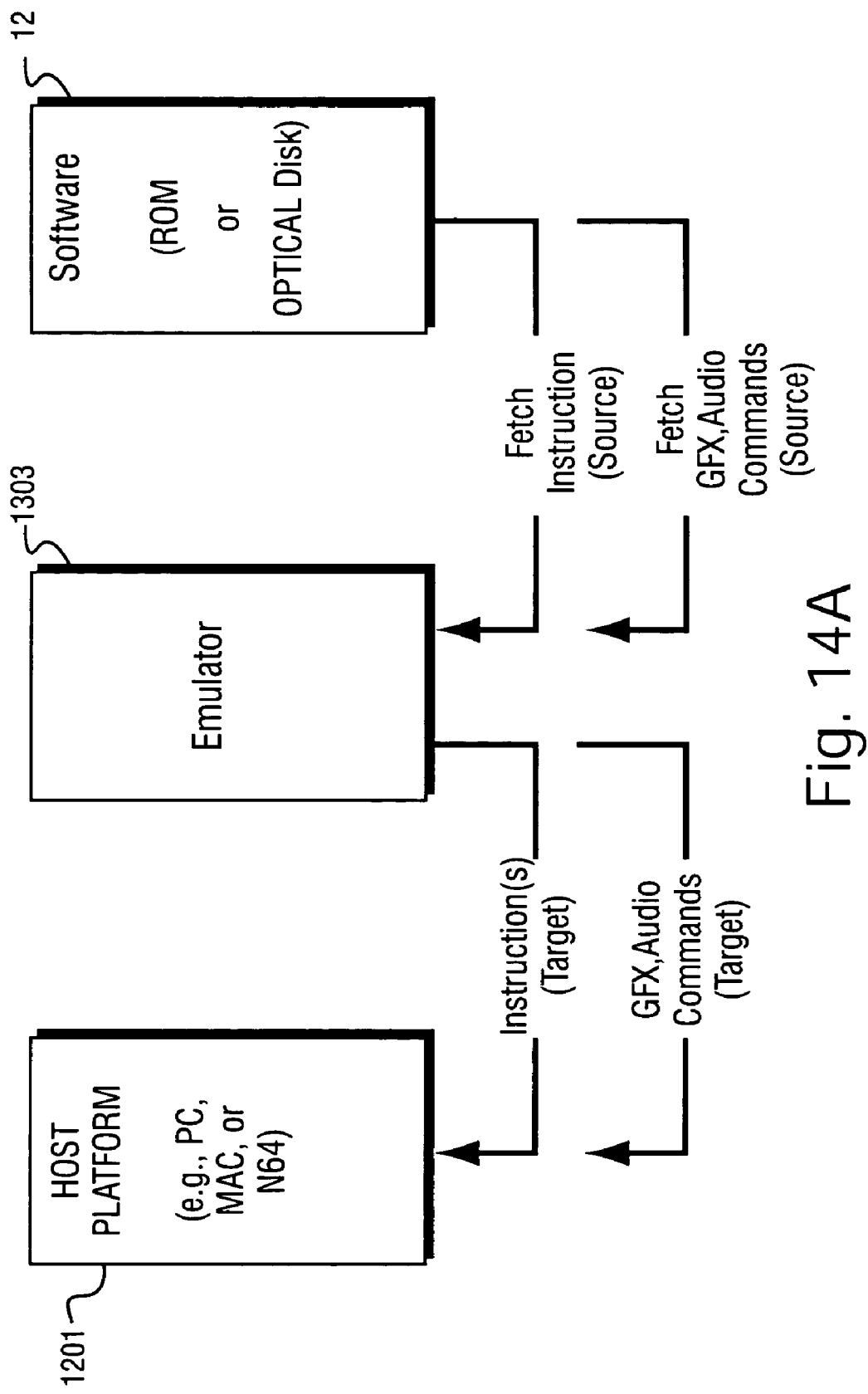
FIG. 14A illustrates an example overall emulation process.

FIG. 14A illustrates an example overall emulation process using a host platform 1201, an emulator component 1303, and a game software executable binary image provided on a storage medium 12. Host 1201 may be a general or special purpose digital computing device such as, for example, a personal computer, a laptop computer, a palm-top computer, a video game console, a portable game machine, a personal digital assistant, an internet appliance, a set-top box, or any other platform with sufficient computing power. Emulator 1303 may be software and/or hardware that runs on host platform 1201, and provides a real-time conversion of commands, data and other information from storage medium 12 into a form that can be processed by host 1201. For example, emulator 1303 fetches "source" binary-image program instructions intended for execution by portable game machine 10 from storage medium 12 and converts these program instructions to a target format that can be executed or otherwise processed by host 1201.

As one example, in the case where the software is written for execution on a platform using a specific processor and the host 1201 is a personal computer using a different (e.g., Intel) processor, emulator 1203 fetches one or a sequence of binary-image program instructions from storage medium 12 and converts these program instructions to one or more equivalent Intel binary-image program instructions. The emulator 1203 also fetches and/or generates graphics commands and audio commands, and converts these commands into a format or formats that can be processed by hardware and/or software graphics and audio processing resources available on host 1201. As one example, emulator 1303 may convert these commands into commands that can be processed by specific graphics and/or or sound hardware of the host 1201 (e.g., using standard DirectX, OpenGL and/or sound APIs).

Figure 14B:
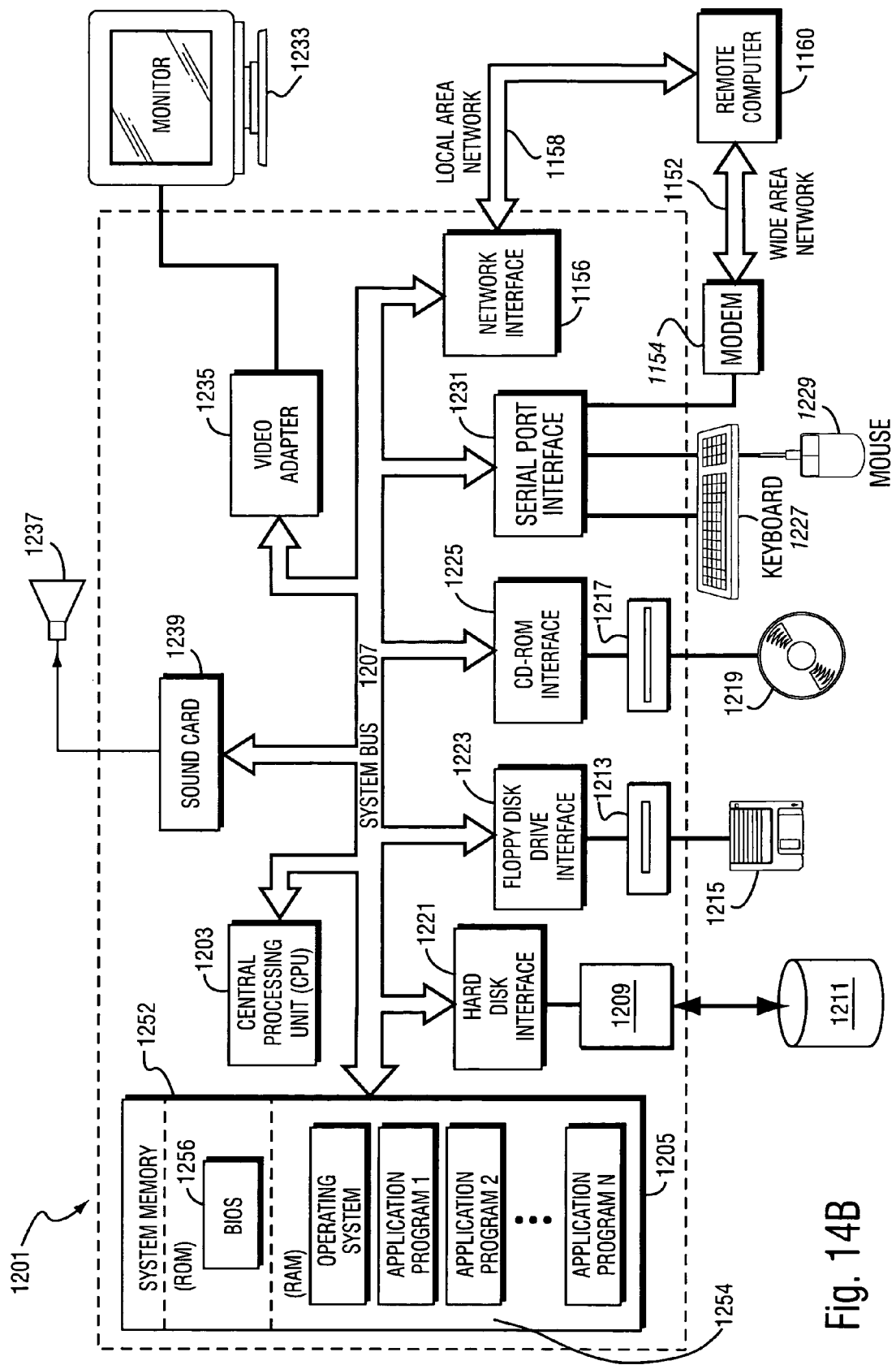
FIG. 14B illustrates one example emulation host system.

FIG. 14B illustrates one example emulation host system 1201 suitable for use with emulator 1303. System 1201 includes a processing unit 1203 and a system memory 1205. A system bus 1207 couples various system components including system memory 1205 to processing unit 1203. System bus 1207 may be any of several types of bus structures including a memory bus or memory controller, a peripheral bus, and a local bus using any of a variety of bus architectures. System memory 1207 includes read only memory (ROM) 1252 and random access memory (RAM) 1254. A basic input/output system (BIOS) 1256, containing the basic routines that help to transfer information between elements within personal computer system 1201, such as during start-up, is stored in the ROM 1252. System 1201 further includes various drives and associated computer-readable media. A hard disk drive 1209 reads from and writes to a (typically fixed) magnetic hard disk 1211. An additional (possibly optional) magnetic disk drive 1213 reads from and writes to a removable "floppy" or other magnetic disk 1215. An optical disk drive 1217 reads from and, in some configurations, writes to a removable optical disk 1219 such as a CD ROM or other optical media. Hard disk drive 1209, magnetic disk drive 1213, and optical disk drive 1217 are connected to system bus 1207 by a hard disk drive interface 1221, magnetic disk drive interface 1223, and an optical drive interface 1225, respectively. The drives and their associated computer-readable media provide nonvolatile storage of computer-readable instructions, data structures, program modules, game programs and other data for personal computer system 1201. In other configurations, other types of computer-readable media that can store data that is accessible by a computer (e.g., magnetic cassettes, flash memory cards, digital video disks, random access memories (RAMs), read only memories (ROMs) and the like) may also be used.

A number of program modules including emulator 1303 may be stored on the hard disk 1211, removable magnetic disk 1215, optical disk 1219 and/or the ROM 1252 and/or the RAM 1254 of system memory 1205. Such program modules may include an operating system providing graphics and sound APIs, one or more application programs, other program modules, program data and game data. A user may enter commands and information into personal computer system 1201 through input devices such as a keyboard 1227, pointing device 1229, microphones, joysticks, game controllers, satellite dishes, scanners, or the like. These and other input devices can be connected to processing unit 1203 through a serial port interface 1231 that is coupled to system bus 1207, but may be connected by other interfaces, such as a parallel port, game port, Fire wire bus or a universal serial bus (USB). A monitor 1233 or other type of display device is also connected to system bus 1207 via an interface, such as a video adapter 1235.

System 1201 may also include a modem 1154 or other network interface means for establishing communications over a network 1152 such as the Internet. Modem 1154, which may be internal or external, is connected to system bus 123 via serial port interface 1231. A network interface 1156 may also be provided for allowing system 1201 to communicate with a remote computing device 1150 (e.g., another system 1201) via a local area network 1158 (or such communication may be via wide area network 1152 or other communications path such as dial-up or other communications means). System 1201 will typically include other peripheral output devices, such as printers and other standard peripheral devices.

In one example, video adapter 1235 may include a 3D graphics pipeline chip set providing fast 3D graphics rendering in response to 3D graphics commands issued based on a standard 3D graphics application programmer interface such as Microsoft's DirectX 7.0 or other version. A set of stereo loudspeakers 1237 is also connected to system bus 1207 via a sound generating interface such as a conventional "sound card" providing hardware and embedded software support for generating high quality stereophonic sound based on sound commands provided by bus 1207. These hardware capabilities allow system 1201 to provide sufficient graphics and sound speed performance to play software stored in storage medium 12.

An emulator 1303 used to provide some or all of the features of the video game system described above may also be provided with a graphic user interface (GUI) that simplifies or automates the selection of various options and screen modes for games run using the emulator. In one example, such an emulator 1303 may further include enhanced functionality as compared with the host platform for which the software was originally intended.

FIG. 14C illustrates another example emulation host system 1201' suitable for use with emulator 1303. The emulation host system in FIG. 14C is generally configured along the lines of a personal digital assistant such as those available from Palm Inc., Handpsring, Inc. and Sony and running an operating system such as Windows CE, EPOC or PalmOS. Typically, such personal digital assistants provide capabilities for a diary/scheduler, to-do lists, phone/address books and the like. System 1201' includes a processing unit 1503 and memory 1505. A system bus 1507 couples various system components including memory 1505 to processing unit 1503. Memory 1505 includes read only memory (ROM) and random access memory (RAM). Memory 1505 may also include external memory in the form of memory cards or memory sticks inserted into a suitable port provided in the housing for the components of system 1201'. A touch-sensitive display screen (e.g., a touch-sensitive liquid crystal display screen) 1509 is also connected to system bus 1507 via an interface 1511. Inputs via touch-sensitive screen 1509 are typically made using a stylus. Other input devices 1513 such as push-buttons, switches, pointing devices and the like are also connected to system bus 1507 via an interface 1515. The input devices may also include external keyboards or game control devices (e.g., joystick, game controller). The input devices may be used as game controls (e.g., starting the game, character movement, character action, etc.) when system 1201' is used with emulator 1303. Games may be written to memory 1505 using communication circuit 1521 which may take the form of a modem for downloading the game from the Internet, for example, or of a cradle (e.g., a USB cradle) for connecting system 1201' to a personal computer.

One or more speakers 1517 are connected to system bus 1507 via an audio interface 1519 to output sounds. A communication circuit 1521 is connected to system bus 1507 via a communications interface 1523 to permit communication with other devices. By way of illustration, communication circuit 1521 may, for example, be a modem and communications interface 1523 may be a serial port. Generally speaking, communication circuit 1521 may be configured for wired or wireless communication in accordance with any conventional communication protocol. A power supply 1525 provides power for the components of system 1201'.

In addition, while digital camera accessory is shown as an add-on device to an existing game system, it is possible to incorporate some or all of the circuitry needed to implement the above-described operations in the portable game system itself.

Any patent documents mentioned above are hereby incorporated by reference into the present application.

Although the present invention has been described and illustrated in detail, this description is for illustrative purposes only and is not to be construed as limiting the present invention.

We claim:

1. A two-piece digital camera accessory for a display system comprising:
   a first unit comprising a first connector adapted for detachable connection to a connector of the display system and receiver circuitry for receiving wirelessly transmitted images; and
   a second unit comprising a connector adapted for detachable connection to a second connector of the first unit, an image sensor and transmitter circuitry for wirelessly transmitting images captured by the image sensor to the receiver circuitry of the first unit,
   wherein when the second unit is connected to the first unit and the first unit is connected to the display system, images captured by the image sensor are transmitted to the display system via a wired connection provided by the first and second connectors of the first unit and the connector of the second unit, and
   wherein when the second unit is detached from and located remotely with respect to the first unit and the first unit is connected to the display system, images captured by the image sensor are transmitted to the display system via the transmitter circuitry of the second unit and the receiver circuitry of the first unit.

2. The digital camera accessory according to claim 1, wherein the second unit and the first unit are detachably connected via an opening formed in the first unit into which the second unit is at least partially inserted.

3. The digital camera accessory according to claim 1, further comprising a memory in the first unit.

4. The digital camera accessory according to claim 3, wherein the memory stores a video game program.

5. The digital camera accessory according to claim 1, wherein the receiving circuitry of the first unit receives images transmitted from a device other than the second unit when the first unit is connected to the display system and the second unit is connected to the first unit.

6. The digital camera accessory according to claim 1, wherein the display system comprises a hand-held video game system.

7. The digital camera accessory according to claim 1, wherein the display system comprises a system configured to emulate a video game system.

8. The digital camera accessory according to claim 1, wherein the display system comprises a video game system.

9. The digital camera accessory according to claim 1, wherein the transmitter circuitry of the second unit compresses the captured images prior to transmission.

10. The digital camera accessory according to claim 1, wherein the transmitter circuitry of the second unit is operable to search for and select one of a plurality of channels for transmitting the captured images.

11. The digital camera accessory according to claim 1, wherein the second unit further comprises a microphone and the transmitter circuitry transmits sounds detected by the microphone.

12. The digital camera accessory according to claim 11, wherein the transmitter is controllable to transmit the sounds detected by the microphone, but not the video captured by the image sensor.

13. The digital camera accessory according to claim 1, wherein the transmitter transmits wirelessly within a frequency band comprising 2.4 to 2.488 GHz.

14. The digital camera accessory according to claim 1, wherein the transmitter transmits wirelessly using a frequency-hopping scheme.

15. The digital camera accessory according to claim 1, wherein the images captured by the image sensor comprise video images.

16. The digital camera accessory according to claim 1, wherein the first unit is detachably connected to the display system via an opening formed in the display system into which the first unit is at least partially inserted.

17. A two-piece digital camera accessory for a display system comprising:

a base unit detachably connected to the display system via an opening formed in a housing of the display system into which the base unit is at least partially inserted, the base unit comprising a first connector adapted for detachable connection to a connector of the display system and receiver circuitry for receiving wirelessly transmitted images; and a camera unit detachably connected to the base unit via an opening formed in a housing of the base unit into which the camera unit is at least partially inserted, the camera unit comprising a connector adapted for detachable connection to a second connector of the base unit, an image sensor and transmitter circuitry for wirelessly transmitting images captured by the image sensor, wherein when the camera unit is connected to the base unit and the base unit is connected to the display system, images captured by the image sensor are transmitted to the display system over a wired connection provided via the first and second connectors of the base unit and the connector of the camera unit, and wherein when the camera unit is detached from and located remotely with respect to the base unit and the base unit is connected to the display system, images captured by the image sensor are transmitted to the display system via the transmitter circuitry of the camera unit and the receiver circuitry of the base unit.

18. A two-piece accessory for a display system comprising:

a base unit comprising a first connector adapted for detachable connection to a connector of the display system and receiver circuitry for receiving wirelessly transmitted data; and a detecting unit comprising a connector for detachably connecting to a second connector of the base unit, a detector and transmitter circuitry for wirelessly transmitting data detected by the detector, wherein when the detecting unit is connected to the base unit and the base unit is connected to the display system, data detected by the detector is transmitted to the display system via a wired connection provided by the first and second connectors of the base unit and the connector of the detecting unit, and wherein when the detecting unit is detached from and located remotely with respect to the base unit and the base unit is connected to the display system, data detected by the detector is transmitted to the display system via the transmitter circuitry of the detecting unit and the receiver circuitry of the base unit.

* * * * *